INVENTOR
KAZUO KIYONAGA
BY John C. LeFever
ATTORNEY

United States Patent Office 3,176,444
Patented Apr. 6, 1965

3,176,444
ADSORPTION SEPARATION PROCESS
Kazuo Kiyonaga, Newark, N.J., assignor to Union Carbide Corporation, a corporation of New York
Filed Sept. 4, 1962, Ser. No. 221,033
28 Claims. (Cl. 55—26)

This is a continuation-in-part of application, Serial Number 60,709, filed October 5, 1960, now abandoned.

This invention relates to an improved process for purifying a fluid stream and more particularly to a process for purifying a fluid stream and also improving the yield of purified fluid.

The prior art purification and separation processes based on adsorption techniques usually consist of a feed fluid stream containing an impurity being passed into a first end of a vessel containing a bed of adsorbent material wherein the impurity is adsorbed and a purified product fluid is discharged from the opposite end of the vessel. The feed fluid stream is passed through the adsorbent bed until the adsorbent approaches impurity saturation and the impurity being adsorbed "breaks through into the product fluid stream at the discharge end of the bed." That is, the product fluid contains a maximum allowable concentration of the impurity. At this point, the feed fluid stream entering the bed is terminated and the bed is subsequently desorbed to prepare the bed for the next adsorption stroke. Although the purified product fluid can be obtained by these prior art systems with little or no impurity, the desorbate fluid stream will always contain some product fluid.

Depending upon the nature and concentration of the impurity component involved, the temperature and pressure at which adsorption is conducted, and the volume of free spaces or voids provided in the adsorbent bed, the amount of product fluid entrapped with the impurity during adsorption can vary from a negligible to a considerable fraction of the total quantity being processed. When removing impurities which are only slightly adsorbable on the adsorbent material at normal temperatures and pressures, it often becomes necessary to operate at high pressures and/or low temperatures to effect the desired purification. The loss of product fluid in the desorbate gas stream under such conditions is considerable and has made such processes uneconomical. When using adsorbents such as pelleted zeolitic molecular sieves, for example, the non-selective voids in a packed bed represent about 55 percent of the bed volume.

One method of reducing the loss of product fluid is to carry out additional selective adsorption separations on the desorbate fluid stream. However, each additional separation requires a complete adsorption-desorption system with all the necessary components such as adsorbent filled chambers, valves, pumps, controls, and the like. It is apparent that such a system is excessively expensive to construct and operate.

One object of this invention is to provide an improved process for purifying a fluid stream and yield a high recovery of product fluid.

Another object of this invention is to provide an improved process for purifying a fluid stream containing an admixture of impurity and product fluid and which will yield a high recovery of product gas and a relatively pure desorbate fluid stream.

Other objects and advantages of the present invention will be apparent from the ensuing description and accompanying drawings.

Figure 1:
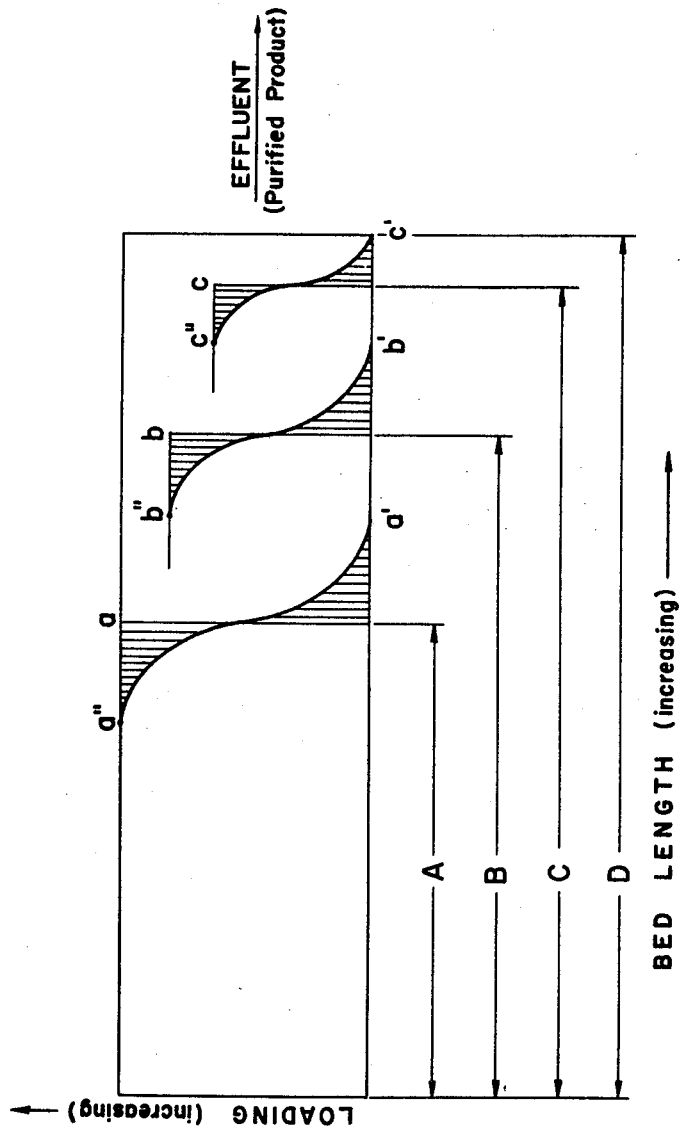
FIG. 1 is a schematic diagram showing the progress of the impurity adsorption front as it moves through an adsorption zone according to the present invention.

The present improved process for purifying a feed fluid stream comprising an admixture of impurity and product fluid requires providing an adsorption zone containing a bed of adsorbent material capable of selectively adsorbing the impurity from the feed fluid stream. The bed, because of the packing of the adsorbent material, contains non-selective voids. The feed fluid stream is introduced and contacted with the bed at an inlet end of the adsorption zone at a first higher pressure thereby adsorbing the impurity in the adsorbent material and trapping part of the product fluid in the voids. An impurity-depleted product fluid is discharged from the opposite end of the adsorption zone. An impurity adsorption front is established at the inlet end of the adsorption zone and then progressively moved longitudinally through the adsorption zone toward the discharge end to the predetermined location within the zone. The introduction of the feed fluid is then terminated. The trapped product fluid in the voids is then removed through the discharge end of the adsorption zone thereby cocurrently depressurizing the adsorption zone from the first higher pressure to a second lower pressure and thereby further moving the impurity adsorption front toward the discharge end of the bed. The adsorption zone is then desorbed to remove the impurity therefrom.

The term "impurity" denotes the component or components which become the adsorbate in the process. Thus the material described as impurity is not limited to a common definition of the term which denotes something unwanted and to be discarded. The term "product" denotes the non-adsorbed fluid in the feed fluid stream and does not necessarily mean that this components is the desired component to which the process is directed.

This process can be performed with any suitable adsorbent, such as zeolitic molecular sieves, activated carbon, silica gel, activated alumina, and the like, having a selectivity for the impurity over the product fluid. Zeolitic molecular sieve adsorbents are very adaptable to the process herein discussed because of their rapid internal adsorption characteristics and/or higher adsorption capacities over a wide range of pressures and concentrations. The combination of rapid adsorption characteristics and high adsorption capacities for molecular sieves results in relatively short impurity adsorption fronts while at the same time permitting the system to be partly depressurized without excessive desorption of the impurities during the cocurrent depressurization stroke.

As previously stated, other adsorbent materials, such as activated carbon, silica gel, activated alumina and the like may be utilized in conjunction with the novel process steps herein set forth. The choice of a particular adsorbent will depend upon many factors. One such factor is the composition of the feed stream to be purified. For example, if removal of carbon dioxide is desired, the choice of the adsorbent would preferably be activated carbon. This is due to the relative affinities of the adsorbent and adsorbates. Carbon dioxide is a relatively strong adsorbate whereas activated carbon is a relatively weak adsorbent. As used herein, it should be understood that the terms "strong" and "weak" adsorbents and/or adsorbates are applied at equal conditions of temperature and pressure. Such a combination is desirable for desorption purposes because the carbon dioxide adsorbate may be removed easily. If a very strong adsorbent, such as molecular sieves were employed, the desorption procedure would become much more elaborate and involved. A strong adsorbent, such as molecular sieves, would preferably be employed when the feed stream contains a relatively weak adsorbate, such as methane. A relatively weak adsorbent, such as silica gel, would preferably be employed when a given feed stream contains very strong adsorbates, such as benzene and toluene. If a strong adsorbent were used to adsorb a strong adsorbate, such as an aromatic compound, the desorption of the adsorbate from the adsorbent material would become extremely difficult.

Another embodiment of the novel process herein set forth contemplates a plurality of adsorbent materials in a series relationship, so as to permit optimum utilization of their relative adsorptive strengths for a particular process, as hereinafter exemplified.

The following table, Table A, is presented to illustrate various adsorbents and the separation processes which would most effectively utilize them.

TABLE A

| Separation Process | Adsorbent | | |
|---|---|---|---|
| | Molecular Sieves | Activated Carbon | Silica Gel |
| H₂O, CO, CO₂ from gaseous mixtures | X | X | |
| CH₄ from He | X | | |
| N₂ from O₂ | X | | |
| Hydrocarbon from CH₄ | X | X | X |
| Olefins from cracked gas | X | X | X |
| CO₂ from natural gas | X | X | |
| Linear from non-linear compounds | X | | |
| Hydrocarbons from hydrogen | X | X | X |
| CO+CO₂ from hydrogen | X | X | |

X indicates acceptability.

Certain adsorbents which selectively adsorb molecules on the basis of size and shape of the adsorbate molecule are referred to as molecular sieves. Zeolites are metal alumino-silicates which exist in crystalline form. Only the crystalline zeolites having the basic formula:

$$M_{\frac{2}{n}}O:Al_2O_3:xSiO_2:yH_2O$$

where "M" represents an exchangeable cation and "n" its valence, are termed zeolitic molecular sieves. In general, a particular crystalline zeolite will have values for "x" and "y" that fall within a definite range.

The fundamental "building block" of any zeolite crystal is a tetrahedron of four oxygen ions surrounding a smaller silicon or aluminum ion. Each of the oxygen ions has two negative charges; each silicon ion has four positive charges; each aluminum ion, three. A silicon thus takes on a "half interest" in the eight charges of the four oxygens which surround it. Each oxygen retains one negative charge which enables it to combine with another silicon or aluminum ion and extend the crystal lattice in all directions. The aluminum ion, with one less positive charge than the silicon, can only satisfy three negative charges of the four oxygens which surround it. To produce a stable crystal structure, it must have the help of another positively charged ion. This is the function of the exchangeable cation "M."

The structure of most crystals extends uniformly in all directions without leaving empty spaces. In zeolitic molecular sieves, however, the framework of silicon-oxygen and aluminum-oxygen tetrahedra forms a structure which is honeycombed with relatively large cavities which are normally filled with water molecules. The size and shape of these cavities depends on the variety of the zeolite.

The zeolitic molecular sieves as described above may be activated by heating to effect the loss of the water of hydration. The dehydration results in crystals interlaced with channels of molecular dimensions that offer very high surface areas for the adsorption of foreign particles.

Adsorption by molecular sieves is limited to molecules having size and shape such as to permit entrance through the pores which connect to the inner sorption areas or cavities, all other molecules being excluded.

Adsorption by other suitable adsorbent materials such as silica gel, activated carbon, activated alumina, and the like, may be described by equations proposed by Langmuir or collectively by Brunauer, Emmett and Teller.

The zeolites occur as agglomorates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

Among the naturally occurring zeolitic molecular sieves suitable for use in the present invention are chabazite, erionite, mordenite, and faujasite. The natural materials are adequately described in the chemical art. The suitable synthetic zeolitic molecular sieves include zeolites A, D, R, S, T, X, Y and L.

The pore size of the zeolitic molecular sieves may be varied by employing different metal cations. For example, sodium zeolite A has a pore size of about 4 angstrom units whereas when calcium cations have been exchanged for at least about 40 percent of the sodium cations calcium zeolite A has a pore size of about 5 angstrom units.

Zeolite A is a crystalline zeolitic molecular sieve which may be represented by the formula:

$$1.0 \pm 0.2 M_{\frac{2}{n}}O:Al_2O_3:1.85\pm0.5SiO_2:yH_2O$$

wherein M represents a metal, $n$ is the valence of M, and $y$ may have any value up to about 6. The as-synthesized zeolite A contains primarily sodium ions and is designated sodium zeolite A as described in more detail in U.S. Patent No. 2,882,243, issued April 14, 1959.

Zeolite T is a synthetic crystalline zeolitic molecular sieve whose composition may be expressed in terms of oxide mole ratio as follows:

$$1.1 \pm 0.4 xNa_2O:(1-x)K_2O:Al_2O_3:6.9\pm0.5SiO_2:yH_2O$$

wherein "x" is any value from about 0.1 to about 0.8 and "y" is any value from about zero to about 8. Further characterization of zeolite T by means of X-ray diffraction techniques is described in copending application Serial No. 733,819, filed May 8, 1958 and issued August 30, 1960 as U.S. Patent No. 2,950,952.

Zeolite X is a synthetic crystalline zeolitic molecular sieve which may be represented by the formula:

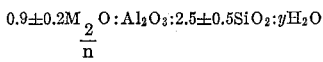

wherein M represents a metal, particularly alkali and alkaline earth metals, $n$ is the valence of M, and $y$ may have any value up to about 8, depending on the identity of M and the degree of hydration of the crystalline zeolite. Sodium zeolite X has an apparent pore size of about 10 angstrom units. Zeolite X, its X-ray diffraction pattern, its properties, and methods for its preparation are described in detail in U.S. Pat. No. 2,882,244, issued April 14, 1959.

Zeolite Y is described and claimed in U.S. Pat. application Serial No. 728,057, filed April 14, 1958 and in U.S. Pat. application Serial No. 862,062, filed December 26, 1959 both in the name of D. W. Breck. These two applications, now abandoned, were combined in Serial No. 109,487, filed May 12, 1961 and issued April 21, 1964 as U.S. Patent No. 3,130,007.

Zeolite L is described and claimed in U.S. Pat. application Serial No. 711,565, filed January 28, 1958 in the name of D. W. Breck and N. A. Acara now abandoned and application Serial No. 214,479 filed August 3, 1962.

Zeolite D is described and claimed in U.S. Pat. application Serial No. 680,383, filed August 26, 1957 in the names of D. W. Breck and N. A. Acara, now abandoned, and application Serial No. 273,549 filed August 17, 1963.

Zeolite R is described and claimed in U.S. Pat. application Serial No. 680,381, filed August 26, 1957 in the name of R. M. Milton and issued April 17, 1962 as U.S. Patent No. 3,030,181.

As a feed fluid stream is passed through an adsorbent bed, the impurity will be selectively adsorbed by the adsorbent at the inlet end of the bed. The impurity will continually be adsorbed at that inlet end until the adsorbent has reached its loading capacity under the adsorption conditions. As more feed fluid is passed through the bed the adsorbent material directly in front of the now fully loaded adsorbent at the inlet end and towards the discharge end will begin adsorbing the impurity. This establishes an impurity adsorption front as illustrated by curve $a''-a'$ of FIG. 1. This front progressively moves longitudinally toward the discharge end of the bed as more feed fluid is passed therethrough.

Typically, in the prior art systems, this front is advanced until "breakthrough," that is, until the leading edge of the impurity adsorption front has reached the discharge end of the bed. At this point, the feed gas introduction to the bed is terminated, and the bed then desorbed. The voids behind the adsorption front contain the feed fluid at inlet conditions and composition. Because of the high pressures frequently necessary for economical fluid separation of large percentage impurity feed fluid streams and the large percentage volume of voids, a large quantity of product fluid remains in the bed after adsorption. Because of this large loss of product fluid, the prior art adsorption systems have been unable to economically compete with other separation systems when separating feed fluid streams containing large percentage quantities of impurity.

One important aspect of the present invention is moving the impurity adsorption front only part way through the adsorption zone before terminating the feed fluid stream thereby providing an unused adsorbent capacity during the adsorption stroke in the discharge end of the bed and then cocurrently depressuring the adsorption zone. This would ordinarily appear to be an inefficient procedure but to the contrary, has been found exceedingly advantageous when combined with the other steps of the invention. As used herein, adsorption zone is defined so as to include both the bed of adsorbent material used for the initial adsorption and the unused-bed capacity. These two adsorbent areas are preferably one continuous bed. However, they might be in two separate beds connected by suitable piping. Behind the impurity adsorption front, that is, between the front and the inlet end, the bed contains a fluid which is in the non-selective areas or voids and an adsorbed phase within or on the adsorbent material.

As previously discussed, at the end of the adsorption stroke the void fluid contains the feed fluid composition under pressure. Since this bed section is in equilibrium, the partial pressure of the impurity component of the void fluid is equal to the pressure of the adsorbed impurity phase.

After the adsorption stroke, the adsorption zone is cocurrently depressurized by removing part of the void fluid from the adsorption zone through the discharge end of the adsorbent bed. As the void fluid is removed, the total pressure of the adsorption zone decreases and the composition of the void fluid changes. As previously stated, the void fluid initially contained behind the impurity adsorption front has a composition similar to the feed fluid composition. As the void fluid is removed, however, the total pressure of the adsorption zone decreases and this lowers the partial pressure of the impurity remaining in the voids. Since at equilibrium the partial pressure of the impurity component of the void fluid must be equal to the pressure of the adsorbed impurity, the pressure of the adsorbed impurity also decreases. Since the capacity of an adsorbent decreases with decreasing pressure, part of the impurity previously adsorbed, desorbs. This desorption reduces the temperature of the bed due to the heats of desorption involved and increases the concentration of the impurity component of the void fluid. Therefore, although the total pressure of the adsorption zone is decreasing, the partial pressure of the impurity does not decrease as rapidly.

The void fluid being removed passes through the unused adsorbent section in front of the impurity adsorption front as the adsorption zone is cocurrently depressurized. This discharging void fluid contains an increasing concentration of the impurity component because of the desorption of the impurity ladened adsorbent as described above and the product fluid. The unused adsorbent capacity adsorbs the impurity from the discharging void fluid and thereby progressively moves the impurity adsorption front further toward the discharge end of the adsorption zone. The cocurrent depressurization is continued until the residual product fluid remaining in the adsorption zone is equal to or less than the tolerable quantity of product fluid which can be discharged in the desorbate fluid stream.

When separating fluids which are all adsorbable in varying degrees, the relative amounts of each component which will be adsorbed on the adsorbent material will depend upon the relative adsorptivities. Relative adsorptivity, $\alpha$, for a binary system is defined as:

$$\alpha = \frac{Y_1 X_2}{Y_2 X_1}$$

where
$X_1$ = mol fraction of the less strongly adsorbed component in the adsorbate,
$X_2$ = mol fraction of the more strongly adsorbed component in the adsorbate,
$Y_1$ = mol fraction of the less strongly adsorbed component in the gaseous phase,
$Y_2$ = mol fraction of the more strongly adsorbed component in the gaseous phase.

During the initial adsorption stroke, when the impurity adsorption front is partially through the adsorption zone, the material adsorbed behind the impurity adsorption front will be in equilibrium with the feed gas stream. Ahead of the impurity adsorption front, some of the less strongly adsorbed constituents will be partially adsorbed. Upon cocurrent depressurization, the impurity adsorption front moves further toward the discharge end of the adsorption zone as previously described. The desorption which occurs behind the impurity adsorption front is selective, that is, the less strongly adsorbed components are preferentially desorbed over the more strongly adsorbed components thereby providing additional concentration of the more strongly adsorbed component in the adsorbent. This preferential desorption continues until the end of the cocurrent depressurization step, which is preferably when the impurity adsorption front has moved to the discharge end of the adsorption zone. Therefore, it is evident that the separation of two adsorbable components can be improved by the employment of the present cocurrent depressurization process. This invention provides a method for obtaining higher purity product gas streams with a higher recovery of the less strongly adsorbed component. The degree of sharpness of the separation depends directly upon the value of $\alpha$, the relative adsorptivity, between the two components being separated. Where only one component of a binary system is adsorbable, $\alpha$ approaches infinity, and is the preferred $\alpha$.

Referring now more specifically to FIG. 1, three impurity adsorption fronts are shown which represent their position within the bed at three pressure levels during the cocurrent depressurization step starting at the adsorption pressure. Between the points $a'-a''$, $b'-b''$, and $c'-c''$ the variation in loading is shown across each front. The distances between each pair of points represents the lengths of the adsorption fronts. The three points, $a$, $b$, and $c$, represent theoretical points behind which the adsorbed phase is in equilibrium with the fluid in the voids. Therefore, each of the points represents the position of a theoretical adsorption front having a maximum rate of mass transfer. These points are termed the stoichiometric front positions. The distances between the points $a'-a$, $b'-b$, and $c'-c$ represent the lengths of bed required beyond the stoichiometric point to completely contain the front at the various positions.

At the end of the adsorption stroke, the stoichiometric front position will have moved through the bed a distance A. Cocurrently depressurizing the bed will then advance the front position a distance B–A beyond its initial location. As the depressurization is continued, the front will advance until a pressure is reached within the bed such that the quantity of product remaining within the bed is equal to or less than the allowable maximum loss. At this pressure, the stoichiometric point will have advanced a distance C through the bed. The total adsorbent required to accomplish the above objectives is equivalent to a distance $C+(c-c')$ or D and the fraction of the bed required to contain the adsorption front which moves forward during the cocurrent depressurization step is equal to the distance D–A divided by the total bed length, D. To determine the total quantity of adsorbent required, heats of desorption and the cooling effects of the gas on expansion as well as the change in composition of the material in the voids at each pressure level must be considered. Therefore, at some final pressure level, the quantity of adsorbent required to contain the impurity within the adsorption zone is equal to the quantity of adsorbent retaining the allowable loss of product within the bed voids. This pressure is the desired final cocurrent depressurization level.

Desorption of the adsorbed impurities after cocurrent depressurization may be accomplished by any desorption technique. Adsorbents may be desorbed by thermal swing cycles, pressure swing cycles, purge-gas stripping cycles, and displacement cycles. Thermal swing cycles desorb the adsorbent by heating the bed to a temperature higher than the adsorption temperature. A major advantage of using a thermal swing cycle is that high adsorbent operating loadings can usually be obtained on the adsorbent. Heat for desorption may be supplied by direct methods such as passing hot gas through the adsorbent bed or indirect methods where the heat transfer fluid does not physically contact the adsorbent, such as using heating coils within the bed.

Purging an adsorbent bed with a non-adsorbable gas will reduce the partial pressure of the adsorbed component in the gaseous phase and cause desorption. The purge gas may be either a condensible or a non-condensible fluid at normal operating conditions. In either case, the term "purge gas" as used herein refers to a non-absorbed or only slightly adsorbed fluid, as distinguished from the adsorbed fluids used in displacement desorption cycles.

Adsorbents may also be desorbed by introducing another adsorbable fluid which displaces all or part of the previously adsorbed material. The displacement fluid may be more strongly or less strongly adsorbed than the adsorbate being displaced. When a more strongly adsorbed fluid is used as the displacement agent, it will be adsorbed and displace the less strongly adsorbed material which was on the adsorbent. Little or no partial pressure stripping occurs. When a less strongly adsorbed fluid is used as the displacing agent, desorption is due to both displacement and partial-pressure stripping.

Adsorptive separation processes can be operated at close to constant temperature by conducting adsorption under pressure and desorption under a reduced total pressure. An operating temperature level is preferable chosen so desorption will readily occur upon a moderate pressure reduction. For higher adsorbent operating loadings, vacuum desorption may be necessary to reduce residual adsorbate. This type of a cycle is elementary because no heating and cooling steps are involved. Any heat requirements to maintain bed temperature may be provided by the adsorber feed stream itself. Because additional time is not required for heating and cooling the beds, the pressure-swing cycle, as well as other adiabatic cycles, can generally be designed to operate more rapidly than thermal-swing cycles. A fast cycle materially reduces the adsorber dimensions and the adsorbent inventory. An additional advantage is the pressure-swing cycle's ability to use gas compression as the main source of energy for the separation process.

The adsorbed phase is best removed from a molecular sieve adsorbent by means of countercurrent desorption techniques. Desorbing countercurrently aids in removing trace contaminants adsorbed at the inlet end of the bed due to the stripping and displacement action of the principal adsorbed phase during desorption. Within limitations, such as, temperature stability, the method of desorption is not dependent on the type of molecular sieve.

In a preferred embodiment, the adsorption zone is cocurrently depressurized from a first higher superatmospheric pressure to a second lower superatmospheric pressure. The zone is then desorbed by drawing a vacuum pressure on the inlet end so as to flow the desorbed impurity countercurrently through the zone and recover a product-depleted impurity fluid stream. Cocurrent depressurization to a lower but still superatmospheric pressure is preferred over depressurization to a vacuum pressure, as an optimum balance between increasing product purity (desirable) and increasing adsorbent bed length (undesirable). It has been found that blowing down to a vacuum pressure necessitates an inordinate bed length to maintain the adsorption front wholly within the bed. That is, the lower the cocurrent blowdown pressure, the greater the tendency for the impurity to be desorbed and discharged from the bed. By only cocurrently depressurizing to an intermediate superatmospheric pressure, a high degree of product-feed separation is maintained and the necessary length of the adsorption zone is minimized.

The specific adsorption and desorption pressures are primarily set by the product specifications. In general, the adsorption pressure is equal to the available feed fluid stream pressure. In some instances, because of the particular separation process involved, it may be necessary to change the pressure of the feed fluid stream to best utilize the selectivity and capacity of a given adsorbent bed.

Preferably, the selection of the desorption pressure is dependent upon the adsorption pressure and the allowable mole fraction of impurity in the purified product fluid stream. The conditions to be met are that at the end of desorption, the impurity left on the adsorbent, hereinafter referred to as the residual impurity or residual adsorbate, must be such that upon switching back to adsorption conditions, the partial pressure of the residual impurity divided by the total pressure of adsorption equals or is less than the tolerable impurity fraction in the product gas stream. This may be represented by the following formula:

$$\frac{\text{Partial pressure of residual impurity}}{\text{Adsorption pressure}} =$$
$$< \text{Allowable mole fraction of impurity in the product gas stream.}$$

For example, if a 99.9 percent pure product gas stream is required and the adsorption pressure is 300 p.s.i.a., the partial pressure of the residual impurity should be about $$(1.00-0.999)\frac{(300)(760)}{14.7}=15.5 \text{ mm. Hg (absolute)}$$

Thus, desorption is conducted until a residual impurity loading is obtained which corresponds to a partial pressure of about 15.5 mm. Hg at the adsorption temperature.

Any one, or any combination of the desorption methods described earlier may be employed to achieve the desired residual impurity. If the adsorbent bed is repressurized with product gas, the stripping action which is obtained can be utilized to help achieve the desired residual impurity. Repressurization should, of course, be countercurrent to achieve this benefit i.e., the repressuring gas must be fed into the discharge end of the vessel. When the repressurization stream has an impurity partial pressure not higher than that permissible as the tolerable impurity fraction in the product stream, the repressurization may be conducted in a countercurrent direction to that of the adsorption flow direction. When the impurity partial pressure of that stream is greater than this, the repressurization flow direction should be cocurrent. Thus, when repressurization is done with the feed stream composition, it must be fed into the inlet end of the vessel. A more detailed description and the benefits derived from countercurrent repressurization is more clearly set forth in the discussion relative to FIG. 5.

In one embodiment in which at least two adsorption zones are employed, the zone having completed its desorption step is partially repressurized by first countercurrently flowing thereto the product fluid from the adsorption zone being cocurrently depressurized. This tends to clean the effluent or product end of the bed, which is important when the adsorption step is renewed and a pure product is to be discharged from this end. After the partial repressurization by countercurrent flow of product fluid, the repressurization step may preferably be completed by passing feed fluid to the adsorption zone in a cocurrent direction. In this manner, an inordinate amount of product fluid is not lost as is often the case when repressurization is entirely by product. Also, the entire system may be connected to a product consuming system, and complete repressurization by product would often introduce undesirable fluctuations in product supply rate.

The adsorption temperature may be determined from equilibria data for the particular separation involved taking into account the heats of adsorption and desorption with a particular adsorbent material. At some given temperature, a maximum operating loading will result for a given set of operating pressures. Operating loading is defined as the difference in adsorption capacity between the adsorption and desorption conditions.

The amount of adsorbent necessary in an adsorption zone depends upon the temperatures and pressures of adsorption, cocurrent depressurization and desorption and the amount of feed fluid being passed therethrough during the adsorption stroke. As previously discussed, the adsorption zone essentially consists of two adsorbent sections, the section in which the impurity adsorption front is established and progressively moved toward the predetermined location during the adsorption stroke and the unused adsorptive capacity of the section in which the impurity adsorption front further progresses toward the discharge end of the zone during the cocurrent depressurization stroke. For convenience, the adsorbent section necessary for the adsorption stroke will be termed the "first adsorbent section" and the adsorbent section necessary to provide the unused capacity the "second adsorbent section." The adsorbent requirement for the first adsorbent section is ascertainable from the following formula:

First adsorbent section adsorbent requirement=

$$\frac{\text{quantity of impurity to be absorbed}}{\text{operating loading+impurity in voids/lb. absorbent}} + X_a$$
(1)

The quantity of impurity to be adsorbed is equal to the adsorption stroke time multiplied by the feed fluid stream rate and the weight fraction of impurity in the feed fluid stream. The operating loading, as previously defined, is equal to the difference in adsorption capacity of the adsorbent material between adsorption and desorption conditions. The impurity in the voids per pound of adsorbent is a function of the volume of the void portion per pound of adsorbent, the feed fluid composition and the pressure and temperature conditions at the end of adsorption. "$X_a$" is equal to an additional quantity of adsorbent necessary to completely contain the impurity adsorption front at the end of adsorption and is represented by $a-a'$ of FIG. 1. The predetermined location of the impurity adsorption front is then defined as the discharge end of the first adsorbent section.

The minimum adsorbent requirement of the second adsorbent section is equal to the total adsorption zone adsorbent requirements minus the first adsorbent section adsorbent requirement. The total adsorption zone requirement may be found by the following formula:

Total adsorption zone requirement (lbs.) =

$$\frac{\text{quantity of impurity to be adsorbed}}{\text{operating loading}+Y} + X_b$$
(2)

The quantity of impurity to be adsorbed is the same total quantity that was used to determine the first adsorbent section adsorbent requirements since no further feed fluid is introduced to the adsorption zone after the adsorption stroke. The operating loading again is defined as the difference in adsorption capacity of the adsorbent between adsorption and desorption conditions. However, for the total adsorption zone, the adsorption conditions are those found at the end of the cocurrent depressurization stroke since those conditions are the conditions under which the total adsorption zone is completing adsorption. "$Y$" is equal to the impurity remaining in the voids of the adsorption zone per pound of adsorbent at the end of cocurrent depressurization. The impurity remaining in the voids at the end of cocurrent depressurization is a function of the volume of void spaces per pound of adsorbent, the composition of the impurity fluid in the voids, and the temperature and pressure conditions at the end of the cocurrent depressurization stroke. "$X_b$" is equal to additional quantity of adsorbent necessary to completely contain the impurity adsorption front at the end of cocurrent depressurization and is represented by $c-c'$ of FIG. 1.

The following example is given to demonstrate a method for determining the amount of a molecular sieve adsorbent required for a given separation. The conditions for the separation are:

Feed composition _____ 40% $CH_4$, 60% $H_2$.
Feed rate _____ 2,000 lb. moles/hr.
Cycle time (per adsorption step) _ 3 minutes.
Molecular sieve volume/lb. M.S. _ 1/43 cu. ft./lb.
Void volume/lb. M.S. _____ 0.59/43 cu. ft./lb.
Adsorption temperature _____ 100° F. (in equilibrium zone after adsorption).
Adsorption pressure _____ 600 p.s.i.a.
Final cocurrent depressurization
  temperature _____ 91° F.
Final cocurrent depressurization
  pressure _____ 300 p.s.i.a.
Final countercurrent desorption
  temperature _____ 44° F.
Final countercurrent desorption
  pressure _____ 16 p.s.i.a.
Operating loading:
  First molecular sieve adsorption
    zone _____ 0.0256 lb./lb. M.S.
  Total adsorption zone _____ 0.0218 lb./lb. M.S.
Product requirement:
  Recovery of at least 80% of the
    $H_2$ at a purity of about 95%.
Composition of void fluid at end of
  adsorption _____ 40% $CH_4$, 60% $H_2$.
Cocurrent depressurization _____ 51% $CH_4$, 49% $H_2$.

Under these conditions:

Quantity of impurity to be
  adsorbed per 3 minutes = (2000)(16)(0.40)(1/20)
                         = 640 lb. $CH_4$ Operating loading = 0.0256 lb/lb M.S.

impurity in voids/lb M.S. = No. of moles of gas in voids/lb.M.S. × percent $CH_4$ × Molecular Weight $CH_4$ $$= \frac{pV}{RT}(0.40)(16)$$

$$= \frac{600(0.59/43)}{10.73(560)}(0.40)(16)$$

$$= 0.00875 \text{ lb } CH_4/\text{lb. M.S.}$$

In view of Equation 1,

1st M.S. adsorbent
  section requirement $= \frac{640}{0.02560 + 0.00875} + X_a$
                      $= 18,700 + X_a$ For an adsorption zone having an inside diameter of 5.5 ft. and under the above adsorption conditions, $X_a$ equals 2,040 lbs.

1st M.S. adsorbent section requirement = 18,700 + 2,040
                                       = 20,740 lbs.

The total adsorption zone requirement is determined from the following:

Quantity of impurity to be adsorbed = 640 lb. $CH_4$
  Operation loading = 0.0218 lb/lb. M.S.

$Y$ = No. of moles gas in voids/lb. M.S. × percent $CH_4$ × molecular weight $CH_4$ $$= \frac{300(0.59/43)}{(10.73)(551)}(0.51)(16)$$

$$= 0.00569 \text{ lbs/lb. M.S.}$$

In view of Equation 2

Total adsorption
  zone requirement $= \frac{640}{0.0218 + 0.00569} + X_b$
                   $= 23,300 \text{ lb.} + X_b$ For an adsorption zone having an inside diameter of 5.5 ft. and under the cocurrent depressurization conditions, $X_b$ equals 2,300 lbs.

Total adsorption zone requirement = 25,600 lbs. M.S.

The total hydrogen adsorbed and in the voids at the end of cocurrent depressurization is 20.5 lbs. Since the total fed per cycle is 120 lbs., hydrogen recovery is 83%. If the bed had not been cocurrently depressurized, the total hydrogen adsorbed and in the voids at the end of the adsorption step is 39 lbs. Thus, hydrogen recovery is only $$\left(\frac{120-39}{120}\right)(100) = 67.5\%$$

The rate at which the adsorption zone is cocurrently depressurized should be controlled so that the instantaneous mass flow rate within the adsorbent bed never exceeds the lifting velocity of the packed bed if the gas flow is upward and no mechanical hold-down device is used. The mass flow rate should also not exceed a value such that the impurity adsorption front lengthens beyond the additional unused adsorbent capacity provided for adsorption during cocurrent depressurization. It has been found that the length of the impurity adsorption front is proportional to the mass flow rate of the gas stream. Hence, a lower mass flow rate during cocurrent depressurization will shorten the impurity adsorption front. This shortened impurity adsorption front makes more efficient use of the adsorbent.

Figure 2:
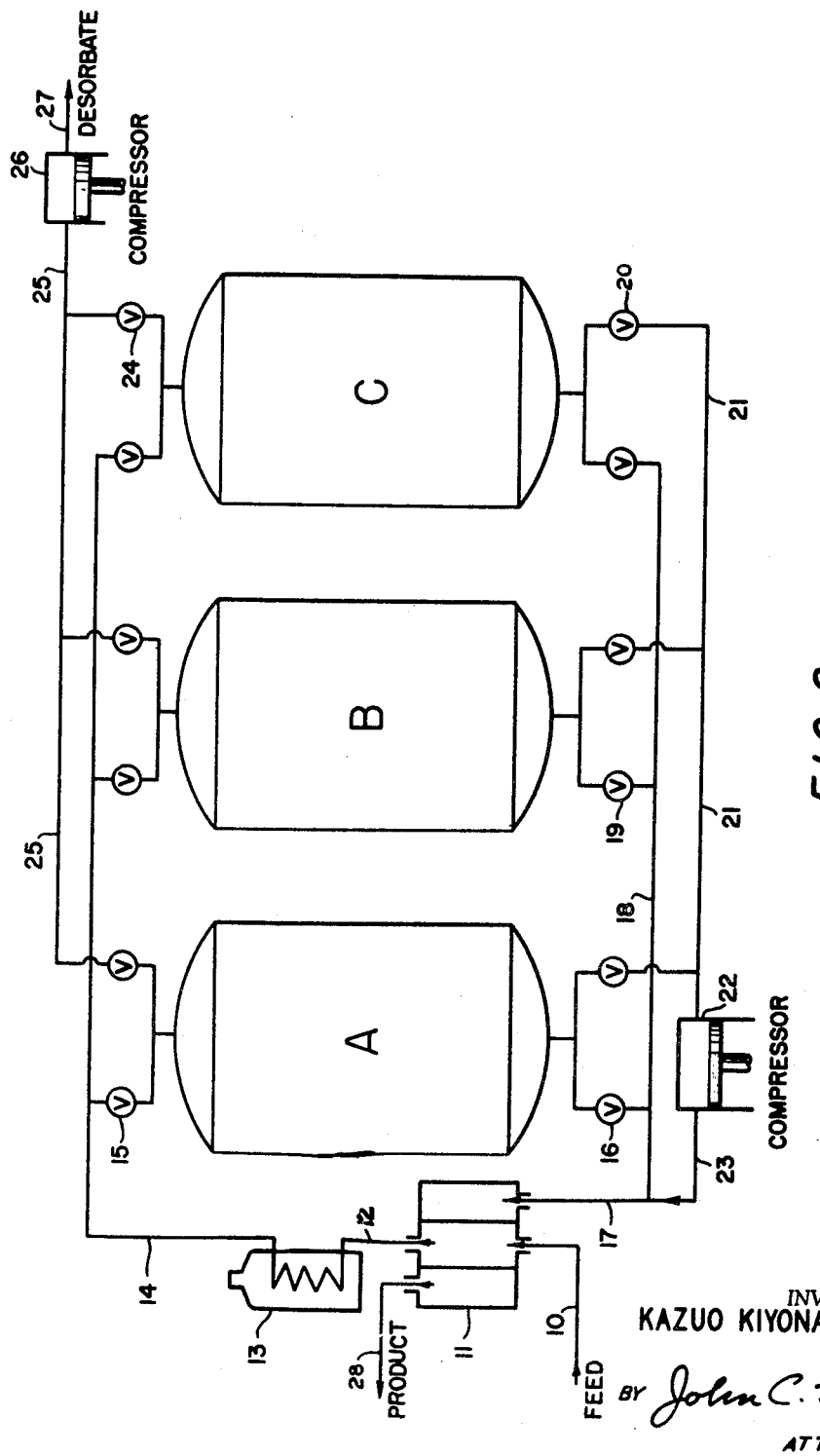
FIG. 2 is a diagrammatic flowsheet of a three-adsorption bed series operated system for purifying a fluid stream according to this invention.

Referring now more specifically to FIG. 2, the feed fluid stream at a first higher pressure is directed (through conduit 10) to heat exchanger 11 where it is heat-exchanged with the product fluid flowing therethrough. The feed fluid stream is then directed through conduit 12 to furnace 13 and heated to the adsorption temperature. Valves 15 and 16 are opened allowing the feed fluid to pass through conduit 14 and adsorption zone A. In passing through adsorption zone A, the feed fluid stream has adsorbed within or on the particular adsorbent, its impurity, and has trapped within the voids a quantity of the feed fluid. The effluent from adsorption zone A is a purified product fluid stream which is passed out of adsorber A through conduit 29 and heat exchanged with the feed fluid stream in heat exchanger 11 before being passed to product storage via conduit 28. Adsorption is continued in adsorption zone A until the impurity adsorption front has moved to a predetermined location within the bed. When this location is reached, valves 15 and 16 are closed thereby terminating the introduction of the feed fluid to adsorption zone A. This completes the adsorption stroke.

Simultaneously, while adsorption zone A is completing an adsorption stroke, adsorption zone B is being repressurized. Valve 19 is opened thereby allowing part of the product fluid effluent from adsorption zone A to pass through conduit 18 to adsorption zone B and thereby repressurize adsorption zone B. Repressurization is controlled so that adsorption zone B is at adsorption conditions at the end of the adsorption stroke of adsorption zone A. This completes the repressurization stroke.

Simultaneously, while adsorption zone A is completing an adsorption stroke and adsorption zone B repressurization stroke, adsorption zone C is being cocurrently depressurized and then desorbed. Valve 20 is opened to cocurrently depressurize adsorption zone C. The effluent from adsorption zone C is a purified product fluid stream at a lower pressure than the adsorption pressure. This lower pressure product fluid stream passes through valve 20 and is directed through conduit 21 to compressor 22. The lower pressure product fluid stream is compressed to product line pressure in compressor 22 and then directed through conduit 23, conduit 17, heat exchanger 11 and conduit 28 to product storage. In cocurrently depressurizing adsorption zone C the impurity adsorption front formed by a previous adsorption stroke is progressively moved further toward the effluent end thereof. Cocurrent depressurization is continued until the product fluid remaining in the voids is equal to the allowable amount which may be lost in the process. An adsorption zone is preferably designed so that this lower pressure is reached when the impurity adsorption front has reached breakthrough. At this point, valve 20 is closed and valve 24 opened to counter-currently desorb adsorption zone C. In countercurrently desorbing adsorption zone C, a desorbate fluid stream is withdrawn through valve 24, conduit 25, compressor 26 and conduit 27. Desorption is continued until the partial pressure of the residual impurity in the adsorption zone at adsorption temperature is equal to or less than the allowable mole fraction of impurity in the product fluid stream multiplied by the adsorption pressure.

The timing of a total cyclic process, as described for a three-bed system as that of FIG. 2 may be such that the cocurrent depressurization and desorption are accomplished in the span of time required for the adsorption stoke as described. However, as will be apparent to one skilled in design of such cyclic processes, the timing of the individual steps of the cycle may be varied to best provide smooth and continuous utilization of the equipment.

Periodically, at the end of each adsorption stroke, the feed fluid stream is directed to the adsorption zone which was previously repressurized, the previously cocurrently depressurized and desorbed adsorption zone is repressurized and the previously adsorbed adsorption zone is cocurrently depressurized and desorbed.

For example, in FIG. 2, the operation described above for adsorption zone A would follow the repressurization step of zone B, the operation described for repressurization zone B would follow the cocurrent and desorption steps of zone C, and the operation described for zone C would follow the adsorption step of zone A.

Figure 3:
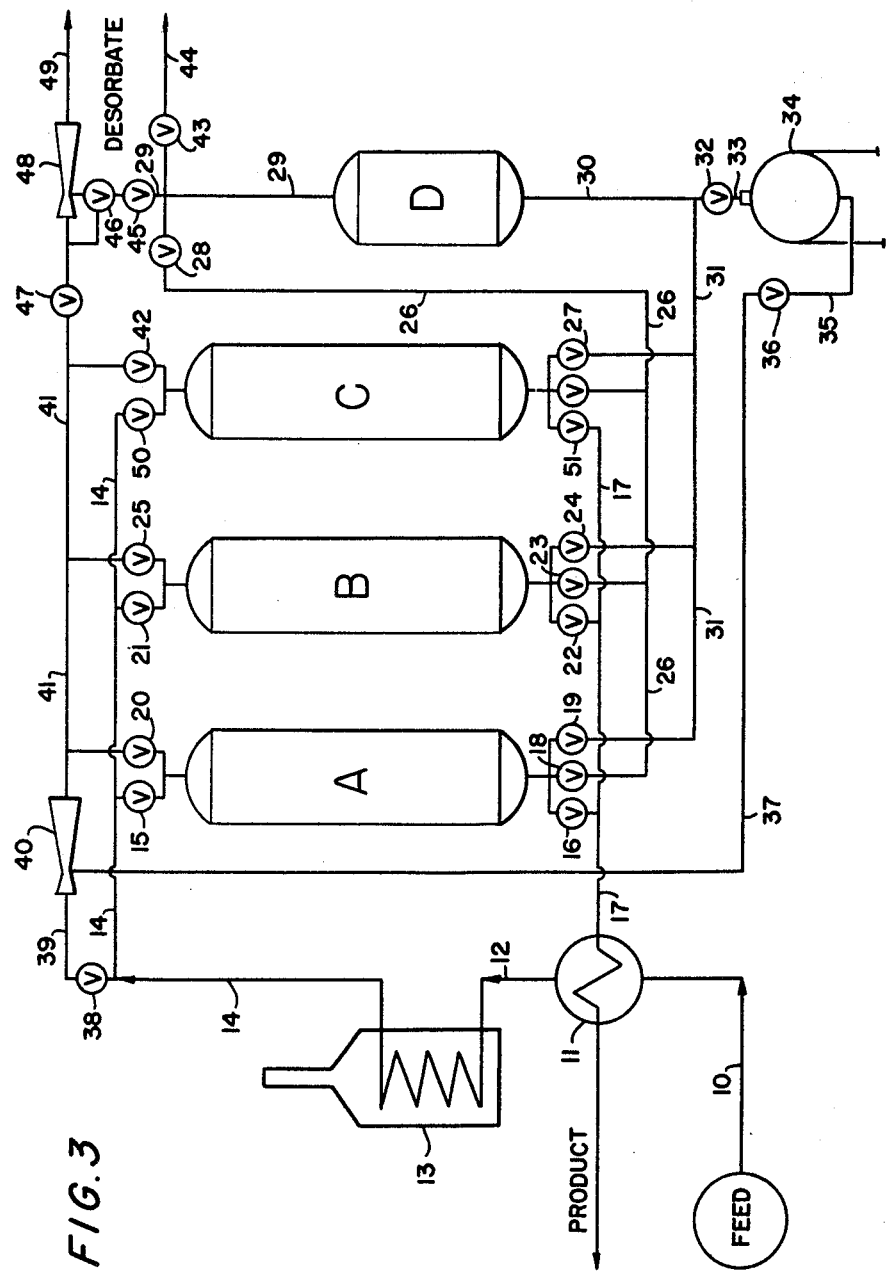
FIG. 3 is a diagrammatic flowsheet of a three-bed series operated system similar to FIG. 2 but using two adsorbent beds to complete the adsorption zone.
Figure 4:
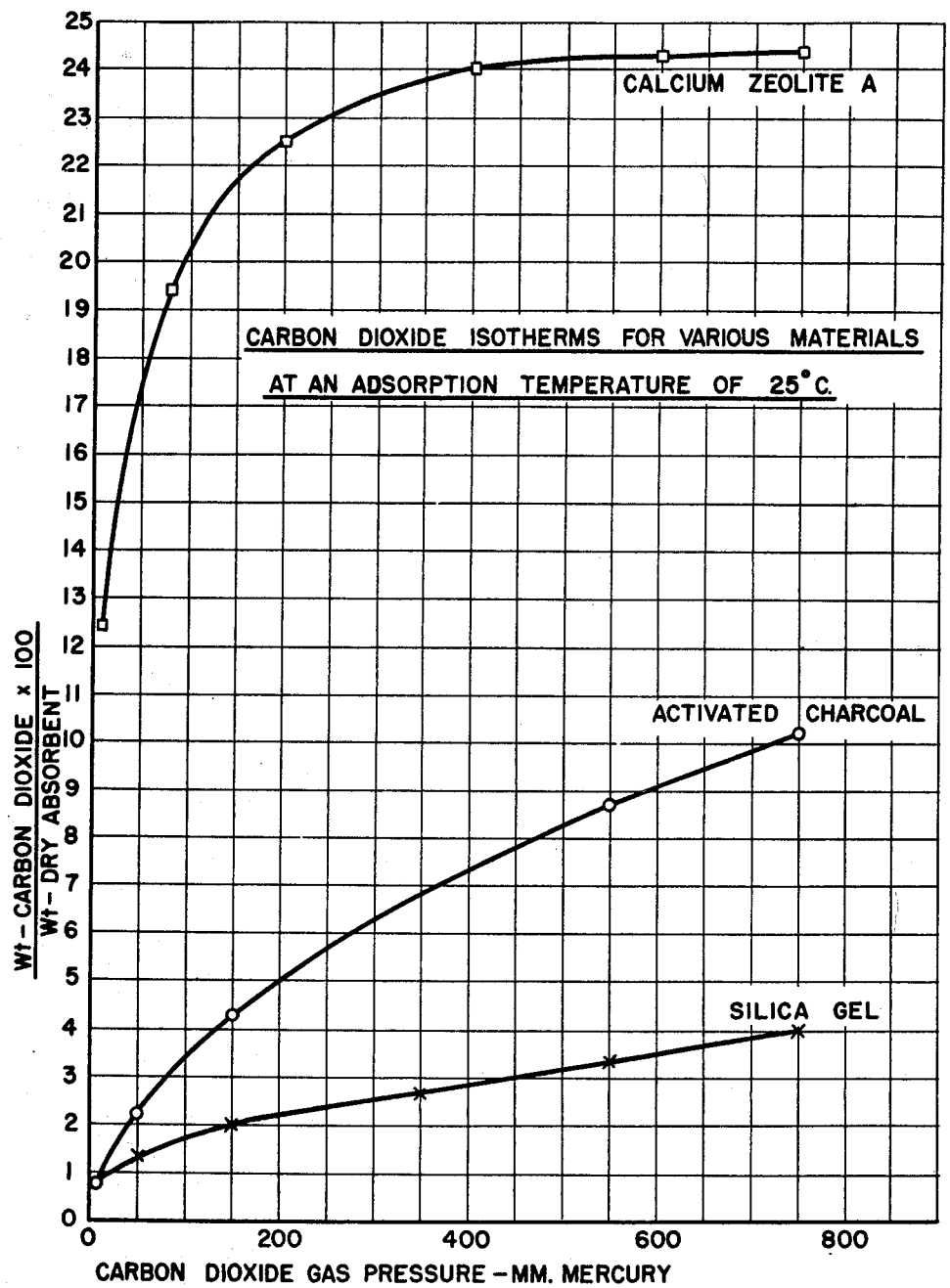
FIG. 4 shows isotherms for silica gel, activated charcoal and molecular sieves.

Referring now more specifically to FIG. 3, the feed fluid stream at a first higher pressure is directed through conduit 10 to heat-exchanger 11 where it is heat-exchanged with the product fluid flowing therethrough. The feed fluid stream is then directed through conduit 12 to furnace 13 and heated to the adsorption temperature. The heated feed fluid stream is then passed through adsorbent bed A by opening valves 15 and 16 and closing valves 18, 19 and 20 thereby directing the feed fluid stream through conduit 14 to adsorption bed A. In passing through adsorbent bed A, the feed fluid stream has adsorbed within the adsorbent its impurity and has trapped within the voids of the bed a quantity of the feed fluid. The effluent from adsorbent bed A is a purified product fluid which is directed through valve 16, conduit 17 and heat exchanged with the feed fluid stream in heat exchanger 11 before being passed to product storage. Adsorption is continued in adsorbent bed A until the impurity adsorption front has progressively moved through the bed until breakthrough. When breakthrough is reached, the feed fluid stream is directed through conduit 14 to adsorbent bed B by opening valves 21 and 22 and closing valves 15, 16, 23, 24, and 25. This completes the adsorption stroke for adsorbent bed A.

Valves 18 and 28 are then opened thereby cocurrently depressurizing adsorbent bed A and partially repressurizing adsorbent bed C. The effluent from adsorbent bed A is passed through valve 18, conduit 26, valve 28 and conduit 29 to adsorbent bed D. In passing through adsorbent bed D the effluent from adsorbent bed A during cocurrent depressurization has its impurity absorbed within the adsorbent of adsorbent bed D. The effluent from adsorbent bed D is a purified product at a lower pressure than adsorption stroke pressure and is directed through conduit 30, conduit 31 and valve 27 to repressurize adsorbent bed C which has previously completed desorption stroke. As the pressures equalize between adsorbent beds C and D, valve 27 is closed and valves 32, 36, 38 and 42 are opened thereby directing part of the feed fluid stream from conduit 14 through valve 38, conduit 39, thermo-compressor 40, conduit 41 and valve 42 to adsorbent bed C and also directing the effluent from adsorbent bed D through conduit 30, valve 32, conduit 33, reservoir 34, conduit 35, valve 36, conduit 37, thermo-compressor 40, conduit 41 and valve 42 to adsorption zone C. The thermo-compressor 40 picks up and recompresses the fluid from reservoir 34 and joins it with the feed gas stream to further repressurize absorbent bed C. The pressure in adsorbent bed A is decreased by this method until the desired cocurrent depressurization or second lower pressure is reached. This completes the cocurrent depressurization stroke for adsorbent bed A.

At this point, valves 18, 28 and 32 are closed and valve 43 is opened thereby venting adsorbent bed D through conduit 29, valve 43 and conduit 44 to atmospheric pressure. When the pressure in adsorbent bed D approaches atmospheric pressure, valves 38, 42, and 43 are closed and valves 20, 45, 47 and pressure-sensitive valve 46 are opened thereby countercurrently desorbing adsorbent bed A through valve 20, conduit 41, valve 47, eductor 48 and conduit 49. The eductor 48 at the same time evacuates adsorbent bed D to a subatmospheric pressure through conduit 29, valve 45, pressure-sensitive valve 46, eductor 48 and conduit 49. As the pressure in adsorbent bed A approaches atmospheric pressure the operation of eductor 48 approaches an unstable condition which is sensed by the pressure-sensitive valve 46. Valve 46 closes and adsorbent bed A is desorbed until the partial pressure of the residual impurity in the adsorption zone at adsorption temperature is equal to or less than the allowable mole fraction of impurity in the product fluid stream multiplied by the adsorption pressure.

When the adsorbent bed A reaches final desorption pressure, valves 21, 22, 45 and 47 are closed and valves 19, 23, 28, 50 and 51 are opened thereby directing the feed fluid stream to adsorbent bed C while adsorbent bed A is being repressurized and adsorbent bed B is being cocurrently depressurized and desorbed. Periodically, the feed fluid stream flows are changed so that one adsorbent bed is adsorbing, the other is cocurrently depressurizing and desorbing and the third adsorbent bed is repressurizing.

The above preferred embodiment uses a single adsorbent bed, adsorbent bed D, to provide the unused adsorbent capacity required during the cocurrent depressurization stroke for each of the adsorbent beds A, B and C thereby completing for each bed the adsorption zone. The use of a single bed such as adsorbent bed D reduces the adsorbent inventory and the size of the main adsorbent beds in a given separation system. Operating the single adsorbent beds separately permits its pressure to be reduced in conjunction with or independent of the main absorbers. Therefore, flexibility of operation is increased and a greater operating loading is possible on the single adsorbent bed. Increasing the operating loading of an absorbent bed such as bed D reduces its size. The use of an eductor, expansion turbine or some other piece of process equipment which may be driven by the exhaust gases during the countercurrent desorption stroke represents a potential power recovery. The use of a thermo-compressor to recompress the recovered purified gases from the reservoir represents a further increase in utilized power recovery. An additional advantage of using two separate adsorbent beds to complete an adsorption zone is that at the end of adsorption, there is a proportionately smaller quantity of product in the voids of the main adsorbent bed which must be recovered and recompressed.

The present process is advantageously usable in many gas separation systems. As long as the impurity is more strongly adsorbent than the desired product fluid, the present invention may be employed. The following list of impurities and fluids is typical of the uses to which this process can be applied:

(1) Removal of oxygen, nitrogen, argon, krypton, ammonia, water, carbon dioxide, carbon monoxide and hydrogen sulfide from air, helium and hydrogen.

(2) Removal of hydrocarbon impurities such as, methane, ethane, propane, butane, ethylene, propylene, butylene, and higher hydrocarbons from hydrogen, helium, argon, neon, krypton, oxygen, and nitrogen.

(3) Removal of carbon dioxide, hydrogen sulfide, ammonia, water, sulfur dioxide from hydrogen, methane, ethane, helium, nitrogen, argon, neon, krypton and oxygen.

(4) Removal of normal paraffins from non-normal hydrocarbon isomers.

(5) Removal of ethylene, propylene, acetylene and unsaturated hydrocarbons from saturated hydrocarbon.

In the following examples the advantages of the present invention are shown:

EXAMPLE 1

In an example of the novel process herein disclosed, a fixed bed molecular sieve may be employed to purify natural gas containing 28% carbon dioxide. The product gas requirements for the process are to recover 85% of the available hydrocarbons with the effluent product containing less than 1% carbon dioxide. The feed gas stream conditions are as follows:

Feed gas summary

Feed rate _____ 100 million standard cubic feed/day.
Pressure _____ 1065 p.s.i.g.
Temperature ____ 100° F.

Feed Composition:
  $CO_2$ _____ Vol. percent__ 28.
  $N_2$ _____ do____ 1.
  $CH_4$ _____ do____ 69.
  $C_2H_6$ _____ do____ 1.3.
  $C_3H_8$ _____ do____ 0.4.
  $i-C$ _____ do____ 0.03.
  $n-C_4$ _____ do____ 0.07.
  $C_5+$ _____ do____ 0.02.
  $H_2S$, 1–2 grains/100 standard cu. ft.
  $H_2O$ _____ Vol. percent__ Saturated The adsorption system comprises five adsorption zones each consisting of a pair of parallel-connected vessels seven and one half feet in diameter and eighty feet high. Each adsorption zone contains 320,000 lbs. of Linde Type 5A ⅛″ molecular sieve pellets. Linde Type 5A ⅛″ molecular sieve pellets are sold by the Linde Company, New York, New York. There is therefore, 160,000 lbs. of molecular sieve pellets in each of the parallel connected vessels. The configuration of the system is similar to that shown in FIG. 2.

The process is based on an essentially adiabatic pressure swing cycle operating between 425° F. and 300° F. and between 1050 p.s.i.g. and 50 mm. Hg. The feed gas stream at 100° F. and 1065 p.s.i.g. is first heat exchanged with the product gas and then heated to about 300° F., the adsorption temperature. A temperature rise due to the heat of adsorption raises the bed temperature to about 425° F. at the end of the adsorption stroke. Each adsorption zone cyclically passes through the following steps:

(1) Repressurization by the feed gas stream until a pressure of 1050 p.s.i.g. is obtained and then adsorption at 300° F. and 1050 p.s.i.g.

(2) Cocurrent depressurization from 1050 p.s.i.g. to 470 p.s.i.g.

(3) Further cocurrent depressurization from 470 p.s.i.g. to 205 p.s.i.g.

(4) Further cocurrent depressurization from 205 p.s.i.g. to 90 p.s.i.g.

(5) Countercurrent vacuum desorption to a final pressure of 50 mm. Hg and a final temperature of 300° F.

Five minutes is allotted for each step to give a total cycle time of 25 minutes. Cocurrent depressurization steps 2, 3 and 4 are primarily to recover the entrapped hydrocarbons from the void spaces. A three-stage compressor is provided to recompress the recovered hydrocarbons from the cocurrent depressurization steps to product line pressure. These recovered hydrocarbons at product pressure are cycled through the heat-exchanger with the products from adsorption and directed to product storage.

The staggered sequence of operation of the five adsorption zones is shown in detail in the following table:

PROCESS TIMING SEQUENCE

Time, Minutes

| | 0–4 | 5–9 | 10–14 | 15–19 | 20–24 |
|---|---|---|---|---|---|
| Adsorption zone #1 | Repressurization and adsorption | Cocurrent depress 1050–470 psig. | Cocurrent depress 470–205 psig. | Cocurrent depress 205–90 psig. | Countercurrent desorption 90 psig–50 mm. Hg. |
| Adsorption zone #2 | Cocurrent depressurization 1050–470 psig. | Cocurrent depress 470–205 psig. | Cocurrent depress 205–90 psig. | Countercurrent desorption 90 psig–50 mm. Hg. | Repressurization and Adsorption |
| Adsorption zone #3 | Cocurrent depressurization 470–205 psig. | Cocurrent depress 205–90 psig. | Countercurrent desorption 90 psig–50 mm. Hg. | Repressurization and Adsorption | Cocurrent depress 1050–470 psig. |
| Adsorption zone #4 | Cocurrent depress 205–90 psig. | Countercurrent desorption 90 psig–50 mm. Hg. | Repressurization and Adsorption. | Cocurrent depress 1050–470 psig. | Cocurrent depress 470–205 psig. |
| Adsorption zone #5 | Countercurrent desorption 90 psig–50 mm. Hg. | Repressurization and Adsorption | Cocurrent depress 1050–470 psig. | Cocurrent depress 470–205 psig. | Cocurrent depress 205–90 psig. |

The effect of the cocurrent depressurization stroke on the hydrocarbon recovery is illustrated in the following table:

| Final cocurrent depressurization pressure (p.s.i.g.): | Percent hydrocarbon recovery |
|---|---|
| 1050 [1] | 45 |
| 540 | 57 |
| 295 | 68 |
| 90 | 85 |
| 35 | 90 |

[1] No cocurrent depressurization.

EXAMPLE 2

In another example of the invention, a molecular sieve process may be employed to purify natural gas containing 53% $CO_2$. The product gas requirements for the process are to recover 46% of the available hydrocarbons with the effluent product containing less than 2% $CO_2$.

The feed gas stream conditions are as follows:

*Feed gas summary*

Feed rate _____ 100 million standard cubic ft./day.
Pressure _____ 1000 p.s.i.a.
Temperature _____ 90° F.

| Feed composition: | Mol. percent |
|---|---|
| Carbon Dioxide | 52.61 |
| Nitrogen | 0.41 |
| Methane | 46.63 |
| Ethylene | 0.32 |
| Propane | 0.02 |
| iso-Butane | 0.01 |
| | 100.00 |

Water, saturated at the conditions.

The adsorption system consists of five main adsorbent beds each consisting of a pair of parallel connected vessels nine feet in diameter and ninety six feet high. Each adsorbent bed contains 544,000 lbs. of Linde Type 5A ⅛″ molecular sieve pellets. There are therefore 272,000 lbs. of molecular sieve pellets in each of the parallel connected vessels. Two further adsorbent beds are provided to supply the unused molecular sieve capacity necessary to complete the adsorption zone for each of the five main adsorbent beds. These adsorbent beds each contain a molecular sieve inventory of 82,000 lbs. of Linde Type 5A ⅛″ pellets and have a 9 foot 2 inch inside diameter and are 25 feet high. The configuration of the system is similar to that shown in FIG. 3.

The process is based on an essentially adiabatic pressure swing cycle operating between 380° F. and 475° F. and between 1000 p.s.i.a. and atmospheric pressure. Cocurrent partial depressurization is utilized to recover the bulk of the hydrocarbons entrapped in the void spaces during adsorption. To readsorb any desorbed carbon dioxide, the hydrocarbons recovered during the cocurrent depressurization stroke are passed through one of the two adsorbent beds which is used to complete the adsorption zone for the main adsorbent beds and the recovered hydrocarbons are recompressed for use in the repressurization of the main adsorbent beds prior to the adsorption stroke.

The feed gas stream at 90° F. and 1000 p.s.i.a. is first heat exchanged with product gas, passed through a heater, and preheated to about 380° F. The feed is then split and passed through two of the five main molecular sieve adsorbent beds where carbon dioxide and water are selectively adsorbed from the hydrocarbons. The non-adsorbed hydrocarbons are directed from the two main adsorbent beds, the available heat being first transferred to the incoming feed gas stream, to the product line. A portion of the non-adsorbed product gas is used to repressurize the main adsorbent bed which is being prepared for the next adsorption stroke.

Following the adsorption stroke, the main adsorbent bed which had just completed adsorption is depressurized cocurrently to recover the hydrocarbons entrapped in the voids. Because some desorption of carbon dioxide occurs during this depressurization, the effluent stream from the main adsorbent bed is passed through one of the two adsorbent beds which complete the adsorption zones, hereinafter called a product recovery vessel, where carbon dioxide is readsorbed. The nonadsorbed effluent from the product recovery vessel is stored in an accumulator drum and used subsequently for repressurizing the main adsorbent beds. Cocurrent depressurization continues until the pressure within the main adsorbent bed falls from 1000 p.s.i.a. to 300 p.s.i.a. At that point, the gas in the voids within the main adsorber consists primarily of carbon dioxide. Desorption is then performed by simply depressurizing the vessel countercurrently to atmospheric pressure. The desorbed carbon dioxide is used to strip off adsorbed water and both are vented off as waste. The adsorbent bed is then ready for repressurization.

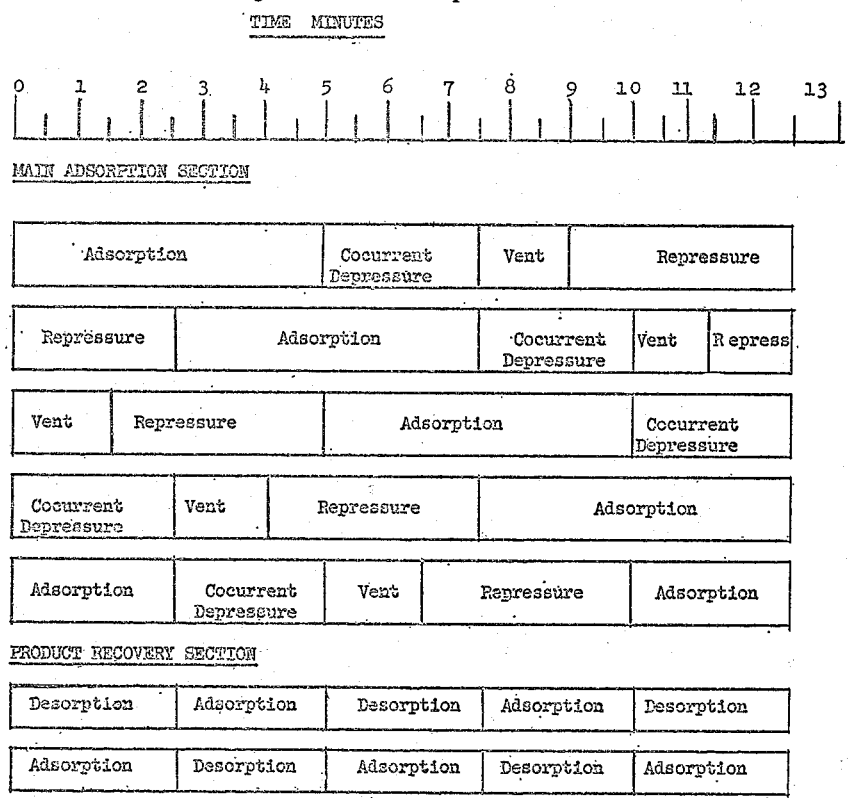

Notes:
1. Vent: Countercurrent depressurization from 300 psia. to 2 psig.
2. Cocurrent Depressurization. This gas passes through the Product Recovery Section. During the initial 2 1/2 minutes the recovered gas is recompressed to provide a portion of the repressure gas. During the final minute, the recovered gas is used to start repressurization of the next bed.

Partial repressurization is accomplished by taking the effluent from the product recovery vessel and passing that gas into the main adsorbent bed. For the final repressurization to 1000 p.s.i.g., two gas streams are used. The first consists of the stored effluent gas in the accumulator drum. This gas is compressed and added to the main adsorbent bed being repressurized. The second gas stream consists of a portion of the product gas leaving the main adsorbent beds. When the pressure reaches 1000 p.s.i.g., the adsorber is ready to repeat the adsorption stroke.

The sequence of the above operations was staggered so that it requires 12½ minutes for each main adsorbent bed to undergo a complete cycle. A fresh adsorbent bed is placed on adsorption every 2½ minutes and each adsorbent bed stays on the adsorption stroke for five minutes. Thus, two adsorbers are always on adsorption. The time allotted for each step of the cycle is as follows:

| | |
|---|---|
| Adsorption | 5 minutes. |
| Cocurrent depressurization | 2 minutes, 24 seconds. |
| Desorption | 1 minute, 30 seconds. |
| Repressurization | 3 minutes, 36 seconds. |
| Total | 12 minutes, 30 seconds. |

The staggered sequence of operation of the five main adsorbers is shown in detail in the table above.

Because a portion of the effluent product gas is removed constantly for repressurization purposes, the remaining gas which goes to the product line flows at an essentially uniform rate.

The two recovery vessels used to readsorb carbon dioxide from the depressurized gas are operated cyclically in the conventional manner. While one is on adsorption, the other is being desorbed by blowdown to atmospheric pressure.

The effect of the final cocurrent depressurization pressure on the hydrocarbon in this process is illustrated in the following table.

| Final cocurrent depressurization pressure (p.s.i.a.): | Percent of hydrocarbon recovery |
|---|---|
| 1000 [1] | 24.9 |
| 500 | 36.6 |
| 300 [2] | 46.1 |
| 200 | 52.9 |

[1] No cocurrent depressurization.
[2] Example 2 pressure.

EXAMPLE 3

A one-inch diameter by 22¾ inch long column containing 164 grams of activated Linde Type 5A molecular sieve pellets was contacted with a dry gas consisting of 15 percent air and 85 percent helium at −40° C. and 98 p.s.i.g. The bed was initially evacuated to less than 1 mm. Hg. (absolute) pressure and repressurized with feed gas at the rate of 280 cc./minute. When a pressure of 98 p.s.i.g. was reached, the outlet valve is opened and the effluent product removed while continuously providing feed gas to maintain the pressure of 98 p.s.i.g. The composition of the effluent gas obtained as a function of time was as follows.

| Time from start of run, minutes: | Percent air in helium product |
|---|---|
| 3 | 0.09 |
| 4 | 0.08 |
| 14 | 0.01 |
| 30 | [1] 0.09 |
| 36.5 | 0.50 |

[1] Breakthrough.

When the air-impurity adsorption front reached breakthrough, the run was stopped and the bed desorbed. The total volume of gas in the desorbate, including the adsorbed phase and the gaseous phase in the voids was found to be 5.15 liters (STP) having a composition of 41 percent helium. The adsorptive loading of air was found to be 2.09 grams per 100 grams of adsorbent. The recovery of helium by this prior art method of operation was found to be 86 percent.

Under the same feed gas conditions, a cocurrent depressurization step was employed just prior to the desorption step to improve the helium recovery. This required adding additional adsorbent, whose capacity is unused during adsorption, to readsorb the air which leaves the saturated zone of the bed. The effect of such a process on the total adsorbent requirement and on the helium yield is shown below:

| Final Cocurrent Depressurization Pressure, p.s.i.g. | Adsorbent Requirement, Grams | Helium Recovery, Percent |
|---|---|---|
| 98 [1] | 164 | 86 |
| 35 | 179 | 94 |
| 5 | 190 | 98.4 |

[1] Adsorption pressure, no depressurization.

EXAMPLE 4

In another example of the present invention a molecular sieve adsorption process according to this invention may be employed to separate normal paraffins from isoparaffins and cyclic hydrocarbons. The feed fluid stream consisting essentially of 30% isobutane and 70% normal butane is separated to produce two product streams, each at a purnity of at least 95%.

The adsorption system comprises two adsorption zones each containing Linde Type 5A, ⅛″ pellets.

The feed fluid is first heat exchanged with a hot isobutane stream, then vaporized and heated to 375° F. and then passed through one of the absorption zones at a total pressure of 150 p.s.i.a. During the adsorption stroke, the adsorbent bed temperature rises from 355° F. to 395° F. due to the heat of adsorption. The non-adsorbed isobutane product which leaves the adsorption zone during adsorption is directed to a heat-exchanger and condensed by heat exchange with the feed fluid and then directed to product storage.

The adsorption stroke is followed by a cocurrent partial depressurization stroke during which the pressure in the adsorption zone is reduced from 150 to 50 p.s.i.a. The major portion of the isobutane contained in the voids spaces after adsorption is discharged from the adsorption zone during the cocurrent depressurization stroke and then condensed and added to the isobutane product storage. The normal butane which is desorbed during the cocurrent depressurization is readsorbed by the additional quantity of adsorbent in the adsorption zone provided for that purpose.

Desorption of the adsorption zone is then performed countercurrently by first reducing the pressure from 50 to 17.5 p.s.i.a. The effluent desorbate is cooled and retained in a gasholder to smooth out the peak flows which occur as the adsorption zone is evacuated. The desorbed normal butane is condensed and directed to product storage. When the adsorption zone pressure reaches 17.5 p.s.i.a. the desorbate fluid stream is directed through a cooler to a vacuum compressor. The vacuum compressor then evacuates the adsorption zone until the average pressure reaches about 0.9 p.s.i.a. Because of the heat of desorption, the adsorption zone cools to about 355° F. during the desorption stroke.

A small quantity of the isobutane from the other adsorption zone which is accomplishing an adsorption stroke is directed to the evacuated adsorption zone to repressurize the zone. The adsorption zone is then ready to repeat the adsorption stroke of the cycle.

The timing sequence for this process is as follows:

| | |
|---|---|
| Adsorption stroke | 5 minutes |
| Cocurrent depressurization stroke | 20 seconds |
| Desorption: | |
| Blowdown | 20 seconds |
| Vacuum | 4 minutes |
| Repressurization | 20 seconds |
| Total cocurrent depressurization desorption and repressurization | 5 minutes |
| Total cycle time | 10 minutes |

Each adsorption zone therefore completes a full cycle every 10 minutes and the two adsorption zones periodically and alternately are switched to the adsorption stroke every 5 minutes.

EXAMPLE 5

In another example of the present invention, a fixed bed of molecular sieves may be employed to remove ethylene from an ethylene oxide reactor blow-off gas. A typical stream from an ethylene oxide reactor consists mainly of nitrogen, carbon dioxide and up to 5 mole percent ethylene. In the present process, the carbon dioxide content of the gas stream is first removed by other means, for example, a methylethyl amine system. The feed gas stream conditions are as follows:

*Feed gas summary*

| | |
|---|---|
| Feed rate | 2.45 mM. s.c.f.h. at 15.0° C. atm. |
| Pressure | 135 p.s.i.g. |
| Temperature | 23° C |

| Feed composition: | Mole percent |
|---|---|
| Ethylene | 4.50 |
| Carbon dioxide | 8.99 |
| Oxygen | 3.80 |
| Ethane | 0.40 |
| Nitrogen | 82.11 |
| Water | 0.20 |

The above feed gas is subjected to a carbon dioxide removal process and the feed stream is reduced to the following composition:

| Composition: | Mole percent |
|---|---|
| Ethylene | 4.94 |
| Carbon dioxide | 0.03 |
| Oxygen | 4.17 |
| Ethane | 0.44 |
| Nitrogen | 90.20 |
| Water | 0.22 |

The adsorption system comprises two adsorption zones each consisting of a vessel 12 feet in diameter and 14 feet high. Each adsorption zone contains 72,000 pounds of Linde Type 5A 1/8" molecular sieve pellets. The configuration of the system is similar to that shown in FIG. 2 except that only two adsorption zones are provided.

The feed gas stream, after passing through a carbon dioxide removal step, is dried to a $-62°$ C. dew point before passing the gas stream to the fixed bed molecular sieve process to be described herein. The dried feed gas is heat exchanged with the non-absorbed gas stream from an adsorption zone, passed through a heater, and preheated to 85° C. at a pressure of 125 p.s.i.g. The feed gas is then directed to an adsorption zone where ethylene and carbon dioxide are selectively removed from the remainder of the stream. During adsorption, the adsorbent bed temperature rises to 105° C. from an initial 85° C. due to the heat of adsorption. During adsorption, the ethylene adsorption front is not allowed to break through at the effluent end of the bed. This adsorption stroke is accomplished in five minutes.

Following the adsorption stroke, the adsorbent bed which has just completed adsorption is depressured cocurrently from 125 p.s.i.g. to nearly atmospheric pressure through a restricted line controlled by a slow-acting valve. When the pressure within the adsorbent bed reaches about 3 p.s.i.g., the gas stream being removed is diverted through compressors which cocurrently depressurize the adsorbent bed to about 8 p.s.i.a. The gas stream removed during this cocurrent depressurization stroke is exhausted from the process. During this cocurrent depressurization stroke, the ethylene loaded on the adsorbent material during adsorption moved further down the bed toward the effluent end and is adsorbed by the unused adsorbent material in the bed. Furthermore, the unadsorbed entrapped gas in the voids during adsorption is essentially removed leaving the bed content substantially ethylene.

This ethylene product now remaining in the bed is removed as a product gas stream by countercurrently desorbing the adsorbent bed. This is accomplished by exchanging the flow to the compressors from the influent end of the bed and further reducing the pressure therein. During this desorption stroke the bed temperature falls to about 85° C. due to the heat of desorption. When the total pressure within the adsorbent bed reaches about 1.0 p.s.i.a. desorption is terminated by closing the appropriate valves.

At this point, a small quantity of the unadsorbed gas stream leaving the adjacent adsorption zone which is on an adsorption stroke, is bled in from the influent end of the evacuated adsorbent bed in order to repressurize the bed before cycling the bed to the adsorption stroke. The entire cocurrent depressurization, desorption and repressurization strokes, including valve changes, is accomplished in five minutes. Thus, the two adsorption zones are cycled so that one is on adsorption for five minutes while the other is completing cocurrent depressurization, desorption and repressurization.

A detailed overall material balance for the above described process is given in the following table:

*Detailed overall material balance*

[Pound moles per hour]

| Component | Fresh Feed | Unadsorbed gas stream | Cocurrent Depressurization gas stream | Desorbate product gas stream |
|---|---|---|---|---|
| Ethylene | 290.0 | 51.50 | 1.63 | 236.87 |
| Carbon dioxide | 1.50 | | | 1.50 |
| Oxygen | 245.00 | 234.40 | 10.27 | 0.33 |
| Ethane | 25.80 | 24.69 | 1.08 | 0.03 |
| Nitrogen | 5,296.00 | 5,066.05 | 222.72 | 7.23 |
| Total | 5,858.30 | 5,376.64 | 235.70 | 245.96 |

This example illustrates, among other things, the use of the present process to recover the "impurity," i.e., the adsorbed component, as the product gas stream and the use of the unadsorbed gas stream to repressurize the adsorbent bed after desorption. It may be seen from the material balance that the desorbate product gas stream contains 96.5 mole percent ethylene and the overall process product recovery is 81.8 percent.

EXAMPLE 6

In another example of the present invention, the process may be employed to recover n-paraffins from heavy hydrocarbons. A feed stream having the following composition was employed to illustrate this use of the present invention:

| Component: | Liquid volume, percent |
|---|---|
| i-$C_4$ | 2.14 |
| n-$C_4$ | 0.2 |
| i-$C_5$ | 15.37 |
| n-$C_5$ | 11.98 |
| 2,2 di-methyl butane | 0.69 |
| 2 methyl pentane | 7.39 |
| 3 methyl pentane | 2.65 |
| n-$C_6$ | 5.58 |
| n-$C_7$ | 3.25 |
| n-$C_8$ | 2.76 |
| n-$C_9$ | 1.56 |
| n-$C_{10}$ | 1.13 |
| n-$C_{11}$ | 0.64 |
| n-$C_{12}$ | 0.125 |
| n-$C_{13}$ | 0.0255 |
| i-$C_7$+ | 44.51 |

An adsorption zone was provided and comprised a vessel having an inside diameter of 2 inches and a height of 62 inches. The adsorption zone contained a bed of Linde Type 5A ⅛" molecular sieve pellets which weighed 5.188 lbs. A continuous two adsorption zone system was simulated by the present experiments by using an external repressurization stream. The repressurization stream comprised mostly nonadsorbable components and had the following composition:

| Component: | Liquid volume, percent |
|---|---|
| i-$C_5$ | 0.3 |
| n-$C_5$ | 3.5 |
| 2,2 di-methyl butane | 3.6 |
| 2 methyl pentane | 74.3 |
| 3 methyl pentane | 15.4 |
| n-$C_6$ | 2.8 |

The adsorption zone was cycled through the steps of adsorption, cocurrent depressurization, countercurrent desorption and repressurization in a continuous manner for four separate runs. Each run followed the next previous run without tampering with the zone so that the cumulative effect of the cycles could be shown. The adsorbate, cocurrent depressurization effluent, and desorbate were collected and analyzed to determine their content. The following tables contain the pertinent process data and results for these four runs:

Hydrocarbons separation.—Summary of Operating conditions

| Run No. | 1 | 2 | 3 | 4 |
|---|---|---|---|---|
| Adsorption Pressure (p.s.i.) | 100 | 100 | 100 | 100 |
| Adsorption Time (Min.) | 5 | 5 | 8 | 8 |
| Adsorption Temperature (° F.) (Average Final Bed Temp.) | 702 | 688 | 667 | 669 |
| Feed Rate (cc./min.) | 36 | 36 | 36 | 37 |
| Co-Current Depressurization Pressure (p.s.i.a.) | 100-14.7 | 100-14.7 | 100-14.7 | 100-14.7 |
| Co-Current Depressurization Time (Min.) | 1.47 | 1.7 | 1.55 | 1.5 |
| Counter-Current Desorption Pressure (p.s.i.a.) | 14.7-0.5 | 14.7-1.0 | 14.7-1.0 | 14.7-1.0 |
| Counter-Current Desorption Time (Min.) | 6.14 | 4.75 | 5.82 | 5.99 |
| Counter-Current Desorption Temperature (° F.) | 681 | 676 | 655 | 648 |
| Repressurization Pressure (p.s.i.a.) | 0.5-100 | 1.0-100 | 1.0-100 | 1.0-100 |
| Repressurization Time (Min.) | 2.77 | 3.08 | 3.33 | 3.3 |
| Bed Weight (Lb.) | 5.19 | 5.19 | 5.19 | 5.19 |
| Bed Height (In.) | 62 | 62 | 62 | 62 |
| Bed Diameter (In.) | 2.0 | 2.0 | 2.0 | 2.0 |
| No. of Cycles/Run | 19 | 22 | 12 | 14 |
| Accumulated Cycles | 19 | 41 | 53 | 67 |
| Bulk Density (Lb./Cu. Ft.) | 44.8 | 44.8 | 44.8 | 44.8 |

Hydrocarbons separation.—Summary of results

| Run No. | 1 | 2 | 3 | 4 |
|---|---|---|---|---|
| Cycle No. | 16-18 | 39-41 | 50-51 | 66-67 |
| Components: | | | | |
| i-$C_4$ | [1] 0.9 | 1.1 | 2.4 | 1.2 |
| n-$C_4$ | 1,330 | 1,393 | 1,190 | 1,283 |
| i-$C_5$ | 106 | 103 | 102 | 89 |
| n-$C_5$ | 102 | 94 | 90 | 86 |
| i-$C_6$ | 114 | 93 | 115 | 109 |
| n-$C_6$ | 96 | 94 | 89 | 87 |
| n-$C_7$ | 106 | 97 | 94 | 94 |
| n-$C_8$ | 81 | 75 | 72 | 71 |
| n-$C_9$ | 96 | 87 | 73 | 84 |
| n-$C_{10}$ | 100 | 83 | 66 | 80 |
| n-$C_{11}$ | 105 | 79 | 62 | 65 |
| n-$C_{12}$ | 103 | 69 | 57 | 51 |
| n-$C_{13}$ | 81 | 47 | 42 | 51 |
| i-$C_7$+ | 107 | 97 | 97 | 101 |
| Total | 107 | 96 | 99 | 98 |
| Wt. Percent Isomers in Desorbate | 12.3 | 7.4 | 6.3 | 10.3 |
| Wt. Percent $C_4$− in Desorbate | 1.07 | 0.45 | 0.23 | 0.28 |
| Wt. Percent n-$C_5$+ in Adsorbate | 1.66 | 1.57 | 1.47 | 1.18 |
| Wt. Percent $C_5$− in Adsorbate | 0.055 | 0.07 | 0.07 | 0.077 |
| Wt. Percent Formed During Adsorption (Use normals in feed as basis) | 0.155 | 0.17 | 0.18 | 0.244 |
| Based on Desorbate Collection (Lb./100 lb.): | | | | |
| Total Operating Loading of Normals $C_5$+ | 1.22 | 1.27 | 1.97 | 2.05 |
| Total Operating Loading of All Normals | 1.51 | 1.40 | 2.15 | 2.24 |
| Total Operating Loading of n-$C_5$ | 0.60 | 0.56 | 0.84 | 0.81 |
| Total Operating Loading of n-$C_6$ | 0.28 | 0.27 | 0.41 | 0.40 |
| Total Operating Loading of n-$C_7$ | 0.18 | 0.16 | 0.25 | 0.26 |

[1] The numbers are expressed in terms of Total Out/Total In×100%.

Material balance for run 1 (cycles 16–18)

| Component | In | | | Out | | | | Material Closure |
|---|---|---|---|---|---|---|---|---|
| | Feed (g.) | Repressurization (g.) | Total (g.) | Adsorbate (g.) | Co-current Depressurization (g.) | Desorbate (g.) | Total (g.) | Out/In×100% |
| $H_2$ | | | | 0.013 | 0.0037 | | 0.0167 | |
| $CH_4$ | | | | 0.048 | 0.144 | | 0.192 | |
| $C_2H_6$ | | | | 0.043 | 0.009 | 0.214 | 0.266 | |
| $C_3H_8$ | | | | 0.011 | 0.0021 | 1.091 | 1.104 | |
| i-$C_4H_{10}$ | 6.90 | | 6.90 | 0.027 | 0.0139 | 0.022 | 0.063 | 0.9 |
| n-$C_4H_{10}$ | 0.63 | | 0.63 | 0.007 | 0.0037 | 8.37 | 8.38 | 1,330 |
| i-$C_5H_{12}$ | 51.54 | 0.26 | 51.80 | 34.735 | 19.282 | 0.687 | 54.70 | 106 |
| n-$C_5H_{12}$ | 41.90 | 3.05 | 44.95 | 2.571 | 0.447 | 42.60 | 45.62 | 105.5 |
| i-$C_6H_{14}$ | 38.80 | 84.80 | 123.60 | 116.088 | 16.66 | 7.97 | 140.71 | 113.8 |
| n-$C_6H_{14}$ | 20.30 | 2.58 | 22.88 | 1.886 | 0.36 | 19.72 | 21.97 | 96.0 |
| n-$C_7H_{16}$ | 11.85 | | 11.85 | | | 12.57 | 12.57 | 106.1 |
| n-$C_8H_{18}$ | 10.28 | | 10.28 | | | 8.37 | 8.37 | 81.4 |
| n-$C_9H_{20}$ | 6.20 | | 6.20 | | | 5.95 | 5.95 | 96 |
| n-$C_{10}H_{22}$ | 4.45 | | 4.45 | | | 4.46 | 4.46 | 100 |
| n-$C_{11}H_{24}$ | 2.56 | | 2.56 | | | 2.69 | 2.69 | 105 |
| n-$C_{12}H_{26}$ | 0.506 | | 0.506 | | | 0.522 | 0.522 | 103 |
| n-$C_{13}H_{28}$ | 0.1085 | | 0.1085 | | | 0.088 | 0.088 | 81 |
| i-$C_7H_{16}$+ | 163.5 | | 163.5 | 113.5 | 55.6 | 6.32 | 175.42 | 107 |
| Total | 359.52 | 90.69 | 450.21 | 268.91 | 92.52 | 121.64 | 482.9 | 107 |

Material balance for run 2 (cycles 39–41)

| Component | In | | | Out | | | | Material Closure |
|---|---|---|---|---|---|---|---|---|
| | Feed (g.) | Repressurization (g.) | Total (g.) | Adsorbate (g.) | Co-current Depressurization (g.) | Desorbate (g.) | Total (g.) | Out/In×100% |
| $H_2$ | | | | 0.01 | 0.0018 | | 0.0118 | |
| $CH_4$ | | | | 0.0355 | 0.009 | | 0.0445 | |
| $C_2H_6$ | | | | 0.048 | 0.0123 | 0.077 | 0.1373 | |
| $C_3H_8$ | | | | 0.0365 | 0.0056 | 0.407 | 0.4491 | |
| $i-C_4H_{10}$ | 6.9 | | 6.9 | 0.0389 | 0.0163 | 0.021 | 0.0762 | 1.1 |
| $n-C_4H_{10}$ | 0.63 | | 0.63 | 0.0116 | 0.0049 | 8.765 | 8.7815 | 1,393 |
| $i-C_5H_{12}$ | 51.54 | 0.252 | 51.8 | 36.807 | 14.887 | 1.414 | 53.11 | 103 |
| $n-C_5H_{12}$ | 41.9 | 2.95 | 44.85 | 2.24 | 0.371 | 39.73 | 42.34 | 94.4 |
| $i-C_6H_{14}$ | 38.8 | 82 | 120.8 | 97.77 | 12.835 | 2.06 | 112.67 | 93.3 |
| $n-C_6H_{14}$ | 20.3 | 2.50 | 22.80 | 1.8 | 0.312 | 19.29 | 21.40 | 93.9 |
| $n-C_7H_{16}$ | 11.85 | | 11.85 | | 0.0466 | 11.494 | 11.54 | 97.4 |
| $n-C_8H_{18}$ | 10.28 | | 10.28 | | | 7.72 | 7.72 | 75.1 |
| $n-C_9H_{20}$ | 6.20 | | 6.20 | | | 5.41 | 5.41 | 87.3 |
| $n-C_{10}H_{22}$ | 4.45 | | 4.45 | | | 3.70 | 3.70 | 83 |
| $n-C_{11}H_{24}$ | 2.56 | | 2.56 | | | 2.02 | 2.02 | 79 |
| $n-C_{12}H_{26}$ | 0.506 | | 0.506 | | | 0.349 | 0.349 | 69 |
| $n-C_{13}H_{28}$ | 0.1085 | | 0.1085 | | | 0.051 | 0.051 | 47 |
| $i-C_7H_{16}+$ | 163.5 | | 163.5 | 106.3 | 47.3 | 4.45 | 158.05 | 97 |
| Total | 359.52 | 87.7 | 447.22 | 245.09 | 75.798 | 106.99 | 427.86 | 96 |

Material balance for run 3 (cycles 50–51)

| Component | In | | | Out | | | | Material Closure |
|---|---|---|---|---|---|---|---|---|
| | Feed (g.) | Repressurization (g.) | Total (g.) | Adsorbate (g.) | Co-current Depressurization (g.) | Desorbate (g.) | Total (g.) | Out/In×100% |
| $H_2$ | | | | 0.009 | 0.00133 | | 0.0103 | |
| $CH_4$ | | | | 0.0259 | 0.00428 | | 0.0302 | |
| $C_2H_6$ | | | | 0.042 | 0.00428 | 0.011 | 0.0616 | |
| $C_3H_8$ | | | | 0.068 | 0.005 | 0.228 | 0.301 | |
| $i-C_4H_{10}$ | 7.36 | | 7.36 | 0.041 | 0.1145 | 0.022 | 0.1775 | 2.41 |
| $n-C_4H_{10}$ | 0.672 | | 0.672 | 0.014 | 0.00336 | 7.985 | 8.00 | 1,190 |
| $i-C_5H_{12}$ | 55.0 | 0.174 | 55.17 | 43.727 | 12.20 | 0.446 | 56.37 | 102 |
| $n-C_5H_{12}$ | 44.7 | 2.04 | 46.74 | 2.353 | 0.241 | 39.43 | 42.02 | 89.9 |
| $i-C_6H_{14}$ | 41.1 | 56.6 | 97.7 | 96.412 | 11.02 | 4.97 | 112.4 | 115 |
| $n-C_6H_{14}$ | 21.7 | 1.72 | 23.42 | 1.669 | 0.208 | 19.05 | 20.927 | 89.4 |
| $n-C_7H_{16}$ | 12.65 | | 12.65 | 0.02 | 0.02 | 11.84 | 11.88 | 93.9 |
| $n-C_8H_{18}$ | 10.96 | | 10.96 | | | 7.84 | 7.84 | 71.5 |
| $n-C_9H_{20}$ | 6.62 | | 6.62 | | | 4.82 | 4.82 | 73 |
| $n-C_{10}H_{22}$ | 4.75 | | 4.75 | | | 3.15 | 3.15 | 66 |
| $n-C_{11}H_{24}$ | 2.73 | | 2.73 | | | 1.69 | 1.69 | 62 |
| $n-C_{12}H_{26}$ | 0.537 | | 0.537 | | | 0.308 | 0.308 | 57.4 |
| $n-C_{13}H_{28}$ | 0.115 | | 0.115 | | | 0.0379 | 0.0379 | 42.1 |
| $i-C_7H_{16}+$ | 174.45 | | 174.45 | 129.16 | 38.37 | 1.05 | 168.58 | 96.6 |
| Total | 383.34 | 60.53 | 443.87 | 273.52 | 62.20 | 102.87 | 438.60 | 98.8 |

Material balance for run 4 (cycle 66–67)

| Component | In | | | Out | | | | Material Closure |
|---|---|---|---|---|---|---|---|---|
| | Feed (g.) | Repressurization (g.) | Total (g.) | Adsorbate (g.) | Co-current Depressurization (g.) | Desorbate (g.) | Total (g.) | Out/In×100% |
| $H_2$ | | | | 0.007 | 0.00242 | | 0.00942 | |
| $CH_4$ | | | | 0.0171 | 0.0051 | | 0.0222 | |
| $C_2H_6$ | | | | 0.081 | 0.0168 | 0.0068 | 0.1046 | |
| $C_3H_8$ | | | | 0.0479 | 0.00699 | 0.303 | 0.3579 | |
| $i-C_4H_{10}$ | 7.06 | | 7.06 | 0.0487 | 0.0117 | 0.0265 | 0.0869 | 1.23 |
| $n-C_4H_{10}$ | 0.683 | | 0.683 | 0.0168 | 0.0055 | 8.74 | 8.762 | 1,283 |
| $i-C_5H_{12}$ | 56.51 | 0.174 | 56.68 | 39.308 | 10.388 | 0.76 | 50.456 | 89 |
| $n-C_5H_{12}$ | 44.40 | 2.04 | 46.44 | 1.875 | 0.1705 | 38.08 | 40.126 | 86.4 |
| $i-C_6H_{14}$ | 41.86 | 56.6 | 98.46 | 90.27 | 9.742 | 7.41 | 107.422 | 109 |
| $n-C_6H_{14}$ | 21.77 | 1.72 | 23.49 | 1.372 | 0.113 | 19.05 | 20.535 | 87.4 |
| $n-C_7H_{16}$ | 13.16 | | 13.16 | | 0.02 | 12.28 | 12.30 | 93.5 |
| $n-C_8H_{18}$ | 11.49 | | 11.49 | | | 8.10 | 8.10 | 70.5 |
| $n-C_9H_{20}$ | 6.634 | | 6.634 | | | 5.60 | 5.60 | 84.4 |
| $n-C_{10}H_{22}$ | 4.884 | | 4.884 | | | 3.91 | 3.91 | 80 |
| $n-C_{11}H_{24}$ | 2.808 | | 2.808 | | | 1.81 | 1.81 | 64.5 |
| $n-C_{12}H_{26}$ | 0.556 | | 0.556 | | | 0.281 | 0.281 | 51 |
| $n-C_{13}H_{28}$ | 0.114 | | 0.114 | | | .0585 | .0585 | 51 |
| $i-C_7H_{16}+$ | 179.18 | | 179.18 | 141.52 | 36.70 | 2.85 | 181.1 | 101 |
| Total | 391.12 | 60.63 | 451.65 | 274.53 | 57.18 | 109.27 | 441.04 | 97.7 |

It is to be noted that the desired product of this process, the normal paraffins, appear in the desorbate or "impurity" stream. Thus, the present process illustrates the applicability of the present process to obtain a substantially pure "impurity" desorbate stream.

Figure 5:
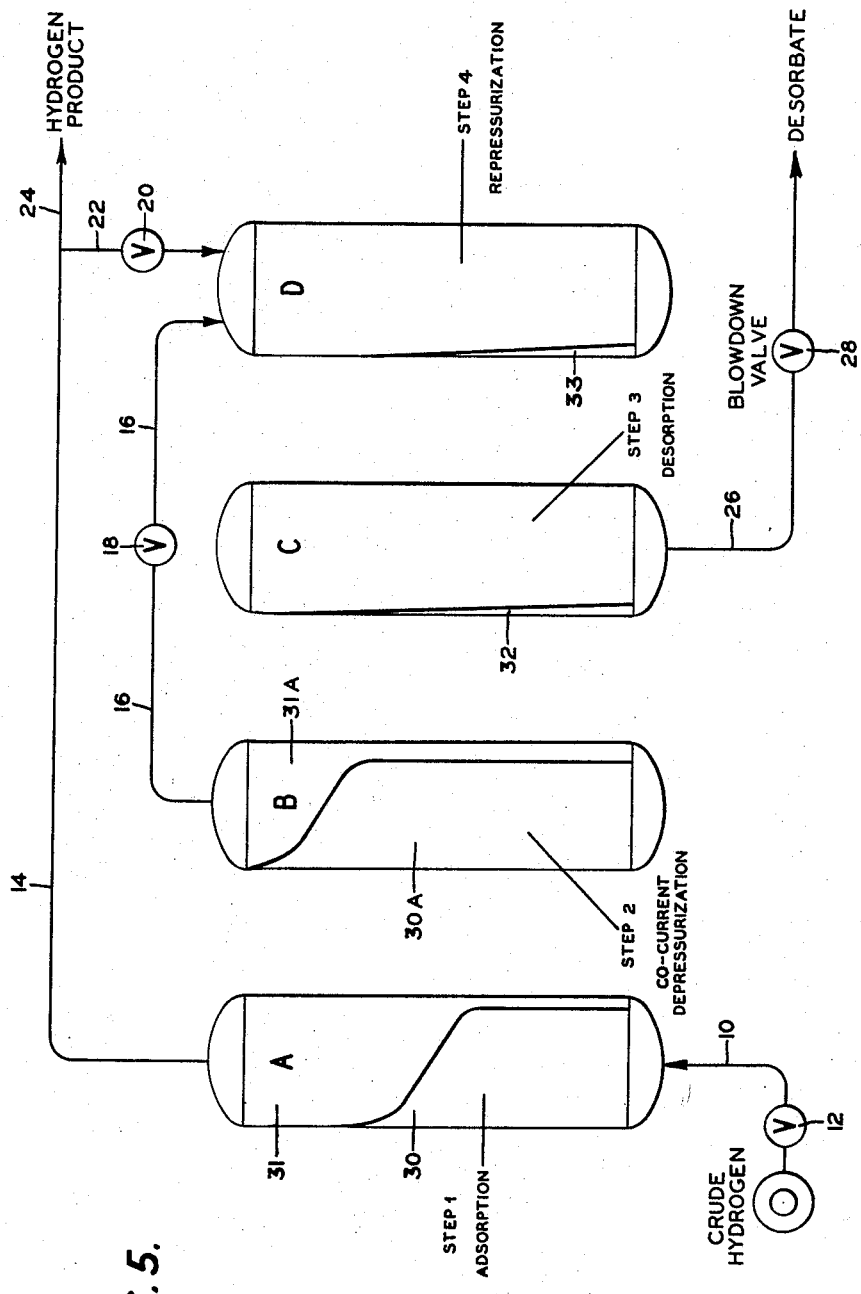
FIG. 5 is a schematic diagram illustrating co-current depressurization utilized in conjunction with a particular desorption and repressurization sequence.

Referring to FIG. 5, this illustrates an exemplary four-step process utilizing co-current depressurization in conjunction with a particular desorption sequence.

A crude feed stream is introduced to adsorber A, having a suitable adsorbent therein, through conduit 10 for adsorption therein. The concentration of the adsorbate constituent accumulating in adsorber A is shown by the shaded area 30. The purified feed stream is withdrawn from the effluent end of adsorber A through conduit 14. The entire effluent stream from adsorber A may be withdrawn as product through branch conduit 24 or a portion may be diverted to adsorber D by cracking valve 20 in branch conduit 22 for partial repressurization of adsorber D. When the adsorbate loading of adsorber A has reached a predetermined location within adsorber A, the admission of crude feed gas thereto is terminated by closing valve 12 in conduit 10.

While adsorber A is on an adsorption stroke, adsorber B, which has just completed an adsorption stroke, is being co-currently depressurized to a predetermined pressure between adsorption pressure and atmospheric pressure. This is accomplished by opening valve 18 in conduit 16 thereby causing the void gas contained with the voids of the adsorbent to pass out of adsorber B but through unused adsorbent portion 31A, still remaining in adsorber B. The purified void gas withdrawn in this manner is passed to adsorber D which has just completed countercurrent desorption stroke. Cocurrent depressurization of adsorber B is continued until the adsorbate constituent has reached a predetermined location within the adsorber or until the adsorbate(s) appear in the effluent stream.

When the cocurrent depressurization step has been completed, the adsorber is ready for desorption. Desorption is accomplished by closing valve 18 and opening valve 28 thereby further reducing the pressure within the adsorber. The final pressure reduction (desorption) may be to some pressure greater than atmospheric pressure, atmospheric pressure, or some pressure less than atmospheric such as evacuation of the adsorber. In addition to evacuating a given adsorber undergoing a desorption stroke it may be desirable to remove still more residual adsorbate from the adsorber. Additional adsorbate removal may be accomplished by countercurrently purging the particular adsorber undergoing desorption with a product effluent, such as that flowing in conduit 14, or an effluent product from the cocurrent depressurization step, such as that flowing in conduit 16. Alternatively to using product purge, the purging operation may be accomplished with a fluid or combination of fluids received from a source separate from the particular adsorption process. If purging is deemed desirable it may be conducted in conjunction with, separate from or in lieu of evacuation. It has been discovered that the purging operation, if accomplished in conjunction with evacuation, should be accomplished after the evacuation and at the pressure of the bed after evacuation. This lowest pressure purge has unexpectedly been most effective in removing the adsorbed phase from the adsorber.

The final step of this four-step process is repressurization as previously described.

It is obvious that steps one and two (adsorption and cocurrent depressurization) may be accomplished in the same adsorber. The above discussion has been directed to discussing four beds to more clearly describe the operation of the four steps in an exemplary process.

When a cycle of the type shown in FIG. 5 is employed, the direction or method or repressurization becomes important. We have discovered that when these four steps have been employed, it is preferable to repressurize a desorbed adsorber countercurrently. The benefit realized when a desorbed adsorber is repressurized may be illustrated by referring again to FIG. 5. The residual adsorbate and distribution thereof after desorption is shown in adsorber C at 32. It will be noted that the distribution of the adsorbate is such that at least a portion of the adsorbate remains at the effluent end of the adsorber. By countercurrently repressurizing the adsorber, the residual adsorbate is thus preferably stripped from the effluent end of the adsorber and is redistributed so as to leave a clean effluent end.

Figure 6:
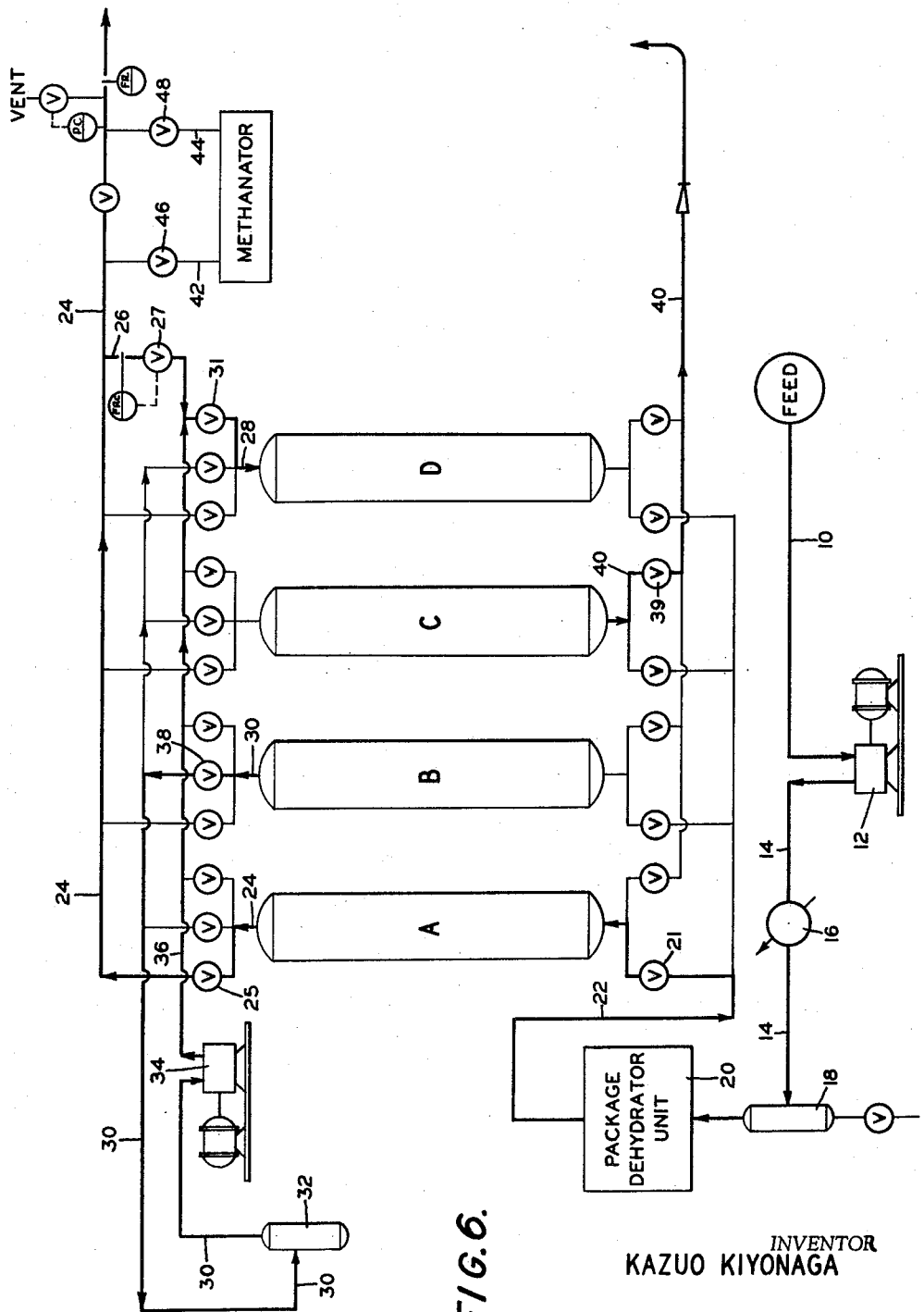
FIG. 6 is a diagrammatic flowsheet of a process utilizing co-current depressurization, activated carbon adsorbent and desorption and repressurization sequence of FIG. 5; and, FIG. 7 is a diagrammatic flowsheet of a process utilizing co-current depressurization in conjunction with thermal desorption.

Referring to FIG. 6, a process for removing substantial quantities of $CO_2$ from a crude hydrogen feed stream will be discussed using activated carbon as the adsorbent material. Although actual process flow rates and operating conditions will be used throughout the discussion, it is to be understood that the process herein set forth is exemplary of the versatility with which the novel cocurrent depressurization step of this invention may be employed.

A crude hydrogen feed stream analyzing 77.2% $H_2$, 20.1% $CO_2$, 1.1% CO, 1.5% $CH_4$ and 0.0% $N_2$ (all percentages expressed in volume), at a pressure of 126 p.s.i.a., a temperature of 100° F. and a flow rate of 5,190,000 s.c.f.d. (Standard Cubic Feet per Day) flowing in conduit 10 is introduced to booster compressor 12 wherein its pressure is increased to 215 p.s.i.a. The pressurized feed stream is discharged into conduit 14 and passed to aftercooler 16 to remove the heat of compression experienced by the crude hydrogen feed stream on compression. The after-cooled, pressurized feed stream is then passed to a knock-out drum 18 and a dehydrator means 20 for removal of liquid and vaporous water respectively. The dried, crude feed stream is discharged into conduit 22, having control valve 21 therein, which is opened, and passed to adsorber A wherein substantially all of the carbon oxides present in the original feed stream are removed. The carbon oxide depleted effluent is discharged from adsorber A into conduit 24, having control valve 25 therein. A portion of the carbon oxide depleted stream flowing in conduit 24 may be diverted to branch conduit 26, having control valve 27 therein, further diverted to conduit 28, having control valve 31 therein, and admitted to the effluent end of adsorber D for partial repressurization thereof. The carbon oxide depleted product stream, flowing in conduit 24, is subsequently withdrawn from the system and is ready for use as a high purity product having a composition of 99.52% $H_2$, 0.03% $CO_2$, 0.27% CO, 0.08% $CH_4$, and 0.10% $N_2$ at a pressure of about 195 p.s.i.a. and a temperature of about 100° F. The rate of withdrawal of the purified products stream is about 3,620,000 s.c.f.d. Adsorber A remains on adsorption until the adsorbate loading reaches a predetermined location within adsorber A, such as that illustrated and discussed in conjunction with FIGS. 1 and 5.

Adsorber B which has just completed an adsorption stroke is ready for cocurrent depressurization. The cocurrent depressurization of adsorber B is begun by opening valve 38 thereby permitting the pressurized void gas contained within adsorber B to pass through the unused adsorbent still available at the effluent end of adsorber B. The carbon oxide depleted product void gas is discharged into conduit 30, passed to knock-out drum 32 and introduced to compressor 34 for repressurization. The repressurized product void gas is discharged into conduit 36, diverted to branch conduit 28 and passed to the effluent end of adsorber D for repressurization thereof and redistribution of residual adsorbate contained therein. The cocurrent depressurization of adsorber B is continued until carbon oxide adsorbate is detected in the product stream or until a predetermined pressure level is reached. This will usually occur when the pressure within the adsorber being cocurrently depressurized reaches some pressure between the adsorption operating pressure and atmospheric pressure, say 40 p.s.i.a. Valve 38 is then closed and the adsorber (adsorber B) is ready for countercurrent desorption.

Adsorber C, which has just finished cocurrent depressurization, is ready for desorption. Desorption is accomplished by opening valve 39 at the influent end of adsorber C. The pressure in adsorber C is reduced and the desorbed adsorbate is passed out of adsorber C through conduit 40. The adsorbate constituents may be recovered or discarded. The amount of material desorbed in this exemplary proces is about 1,570,000 s.c.f.d. The desorption of adsorber C is continued until the pressure is just above atmospheric, say 17 p.s.i.a. The composition of the desorbate stream is: 25.5% $H_2$, 66.7% $CO_2$, 2.9% CO, 4.7% $CH_4$ and 0.2% $N_2$.

The above process clearly illustrates the versatility with which the process of this invention may be employed, i.e. the particular adsorbent material and the method by which given adsorbate(s) may be desorbed, may vary, but all processes clearly utilize the inventive concept, viz, cocurrent depressurization, herein set forth.

Another adsorbent material which was found to be useful in conjunction with the basic process of this invention is silica gel. A typical feed stream upon which the process steps of this invention are very useful would be the separation of certain aromatics, such as benzene, toluene and xylene, from close boiling non-aromatic hydrocarbon such as paraffins and naphthenes.

Figure 7:
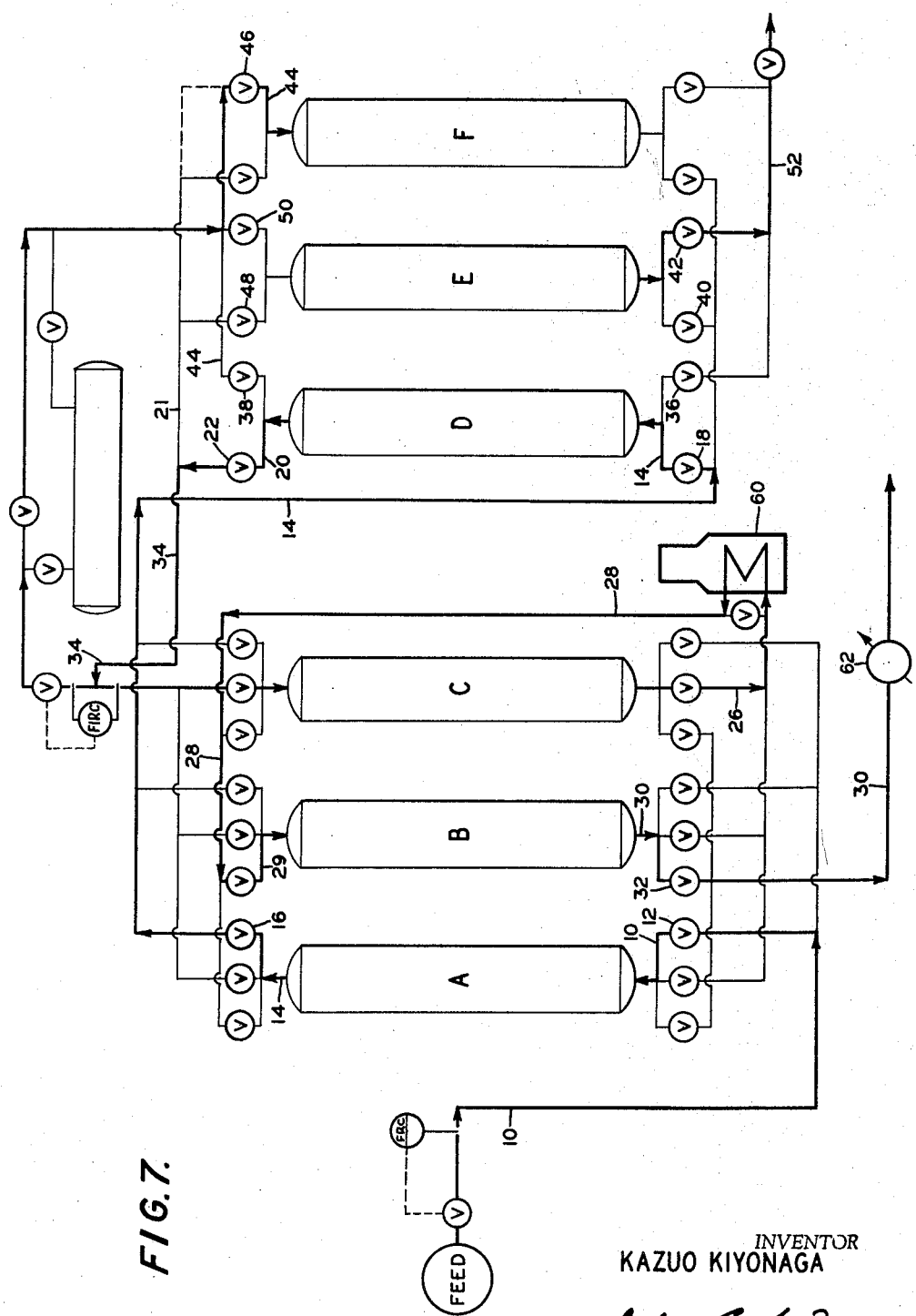

Referring now to FIG. 7 there is illustrated a process utilizing a plurality of adsorbents, thermal desorption and cocurrent depressurization. Although this particular illustration will be discussed in conjunction with a specific adsorbent sequence and a feed of a particular composition, viz., hydrogen and saturated hydrocarbons, modification thereto may be made without affecting the novelty thereof.

A crude hydrogen feed stream at 100° F. and 750 p.s.i.g. and having the following composition:

| Constituent: | Mol. percent |
|---|---|
| $H_2$ | 66.33 |
| $C_1$ | 27.02 |
| $C_2$ | 3.49 |
| $C_3$ | 1.65 |
| $C_4$ | 0.28 |
| $C_5$ | 0.02 |
| $C_6$ | 0.01 |
| $C_6H_6$ | 0.98 |
| Toluene | 0.16 |
| $H_2O$ | 0.05 |
| $H_2S$ | 0.01 | flowing in conduit 10 is passed to adsorber A. Adsorber A contains a plurality of adsorbents. The lower portion, or influent end, of adsorber A contains a relatively weak adsorbent, such as, silica gel. Above the bed of relatively weak adsorbent is a bed of relatively stronger adsorbent material, such as activated carbon. The very strong adsorbate constituents of the crude feed stream, such as, the aromatics, water and hydrogen sulphide, are adsorbed on the silica gel layer at the influent end of adsorber A. The adsorbate constituents in the $C_5$ and $C_6$ range are not so readily adsorbed by this adsorbent material but are readily adsorbed by the activated carbon adsorbent immediately thereafter. Adsorber A, therefore, with its two types of adsorbents removes the strong adsorbate constituents, aromatics, water and hydrogen sulphide, and the relatively weaker adsorbate constituents, $C_5$ and $C_6$ hydrocarbons.

The $C_5$ and heavier adsorbate depleted feed stream flows out of adsorber A through conduit 14, having valve 16 therein. The partially depleted feed stream is then passed to adsorber D. Adsorber D is also composed of a plurality of adsorbent materials. A layer of silica gel is located at the influent end of adsorber D to adsorb the strong adsorbate constituents and a molecular sieve layer located above the silica gel to remove the weak adsorbate constituents. Upon passage through the molecular sieve layer of adsorber D, a substantial portion of the $C_1$ constituent of the original feed stock is retained therein as well as essentially all of the $C_2$ to $C_4$ hydrocarbons. The removal of the predominately weak adsorbate constituents of the crude feed stream, primarily methane and the $C_2$–$C_4$ hydrocarbons, is continued until the adsorbate impurity front within adsorber D reaches a predetermined location therein. The adsorbate impurity front which is moving forward in adsorber A is not stopped at some predetermined location. This is because adsorber A, as well as adsorber B and C, are not cocurrently depressurized.

The product effluent leaving adsorber D through conduit 20 is passed to conduit 34. A portion of the product effluent is diverted to conduit 21 for passage to adsorber F, which has just completed a desorption stroke, for partial repressurization thereof. The product effluent flowing in conduit 34 is passed to the effluent end of adsorber C, which has just been heated and desorbed, for cooling thereof. The warmed product effluent stream is withdrawn from the influent end of adsorber C through conduit 26 and passed to heater 60 for further warming of the product effluent stream. The further warmed product effluent stream now flowing in conduit 28 is diverted to conduit 29 for passage to adsorber B. Adsorber B which has just completed an adsorption stroke is substantially loaded with the aromatic and $C_5$–$C_6$ hydrocarbon adsorbate constituents of the crude feed stream. The heated product effluent desorbs these relatively strong adsorbate constituents from the adsorbent materials of adsorber B.

The process product stream, i.e., the product effluent from adsorber D and the relatively strong adsorbate constituents of adsorber B, are passed out of adsorber B, at the influent end thereof, through conduit 30 and passed to aftercooler 62. The cooled process product stream at a temperature of about 100° F. and 730 p.s.i.g. has the following composition:

| Constituent: | Mol. percent |
|---|---|
| $H_2$ | 90.89 |
| $C_1$ | 6.83 |
| $C_5$ | 0.04 |
| $C_6$ | 0.02 |
| $C_6H_6$ | 1.79 |
| $C_6H_5CH_3$ | 0.30 |
| $H_2S$ | 0.02 |
| $H_2O$ | 0.11 |

When adsorber D is ready for cocurrent depressurization, valves 18 and 22 are closed and valve 38 is opened. The void gas is passed through the unusued adsorbent material still remaining in adsorber D at the effluent end thereof. The product void effluent is passed through conduit 44 and introduced countercurrently to the effluent end of adsorber F for partial repressurization thereof, thereby redistributing the residual adsorbate still remaining therein.

Adsorber E which has just completed a cocurrent depressurization stroke is now ready for desorption. With valves 40, 48 and 50 closed and valve 42 opened, the relatively weak adsorbate constituents are desorbed from the strong adsorbent material (molecular sieves) and passed out of the system through conduit 52. The composition of the desorbate is as follows:

| Constituent: | Mol. percent |
|---|---|
| $H_2$ | 36.6 |
| $C_1$ | 51.5 |
| $C_2$ | 7.7 |
| $C_3$ | 3.6 |
| $C_4$ | 0.6 |

Thus, by proper choice and location of adsorbents to match feed composition, the step of cocurrent depressurization may be utilized with a wide variety of feed streams having a wide range of adsorbate constituents of varying adsorptivity.

The examples presented herein demonstrate the process of the invention in which the feed fluid is either normally gaseous or is being processed in the vapor phase. The process, however, may also be advantageously employed to separate mixtures in the liquid phase.

The flow through the adsorption zone in a liquid phase separation should be in a vertical direction, either upward or downward, so that the gas phase-liquid phase interface which will be formed upon depressurization will be in a position normal to the direction of mass flow.

When liquid upflow is employed, the depressurization rate should be moderated so that the vapor evolution rate will not cause violent movement of the fixed bed thereby causing a "smearing" of the forward moving impurity adsorption front.

When liquid downflow is employed, it is desirable to operate under temperature and pressure conditions so that the liquid and vapor densities are approximately equal during the cocurrent depressurization to avoid channeling of the void space liquid containing unadsorbed impurity into the lower region of the adsorption zone.

A satisfactory method for handling liquid downflow is to have an adsorption zone which consists of two separate adsorbent beds and to conduct the adsorption stroke in the liquid phase until the impurity adsorption front has progressed substantially through the first adsorbent bed and cocurrently depressurizing the total adsorption zone by removing a vapor through the second adsorbent bed.

Although particular embodiments of this invention have been described in detail, it is contemplated that modifications of the process may be made and that some features may be employed without others, all within the scope of the invention.

What is claimed is:

1. A process for purifying a fluid stream which comprises providing a feed fluid stream containing an admixture of impurity and product fluid; providing an adsorption zone having an inlet and a discharge end and containing therein a bed of adsorbent particles capable of selectively adsorbing said impurity from said feed fluid stream, said bed having voids between the adsorbent particles; introducing said feed fluid stream to said inlet end of said adsorption zone and contacting such stream with said bed at a first higher pressure thereby adsorbing said impurity within said bed and trapping part of said feed fluid in said voids; continuously discharging an impurity-depleted product fluid stream from said adsorption zone discharge end at substantially said first higher pressure during the introduction of said feed fluid stream to the adsorption zone inlet end; establishing an impurity adsorption front at said inlet end of said adsorption zone; progressively moving such front longitudinally through said adsorption zone toward said discharge end to a predetermined location within said adsorption zone; terminating the introduction of said feed fluid stream at said first higher pressure to said inlet end of said adsorption zone; removing at least most of the trapped product fluid component of the feed fluid in said voids through said discharge end of said adsorption zone as a separate fluid stream thereby cocurrently depressurizing said adsorption zone from said first higher pressure to a second lower pressure and thereby further moving said impurity adsorption front toward said discharge end of said adsorption zone; and thereafter desorbing said adsorption zone to remove said impurity therefrom.

2. A process for purifying a fluid stream which comprises providing a feed fluid stream containing an admixture of impurity and product fluid; providing an adsorption zone having an inlet and a discharge end and containing therein a bed of adsorbent particles capable of selectively adsorbing said impurity from said feed fluid stream, said bed having voids between the adsorbent particles; introducing said feed fluid stream to said inlet end of said adsorption zone and contacting such stream with said bed at a first higher pressure thereby adsorbing said impurity within said bed and trapping part of said feed fluid in said voids; continuously discharging an impurity-depleted product fluid stream from said adsorption zone discharge end at substantially said first higher pressure during the introduction of said feed fluid stream to the adsorption zone inlet end; establishing an impurity adsorption front at said inlet end of said adsorption zone; progressively moving such front longitudinally through said adsorption zone toward such discharge end to a predetermined location within said adsorption zone; terminating the introduction of said feed gas stream at said first higher pressure to said inlet end of said adsorption zone; removing at least most of the trapped product fluid component of the feed fluid in said voids through said discharge end of said adsorption zone as a separate fluid stream thereby cocurrently depressurizing said adsorption zone from said first pressure to a second lower pressure and thereby further moving said impurity adsorption front toward said discharge end of said adsorption zone; thereafter desorbing said adsorption zone to remove said impurity therefrom; and repressurizing said adsorption zone to said first pressure.

3. A process as described in claim 1 wherein the fluid is a gas.

4. A process as described in claim 2 wherein the fluid is a gas.

5. A process for continuously purifying a fluid stream which comprises providing a feed fluid stream containing an admixture of impurity and product fluid; providing two adsorption zones each having an inlet and a discharge end and containing therein a bed of adsorbent particles capable of selectively adsorbing said impurity from said feed fluid stream, said bed having voids between the adsorbent particles; introducing said feed fluid stream to the first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the adsorption zone inlet end; establishing an impurity adsorption front at said adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; simultaneously with the first zone adsorption stroke, removing at least most of the product fluid component of the feed fluid previously trapped in the voids of the second adsorption zone during a preceding adsorption stroke wherein an impurity adsorption front was established at a location intermediate said inlet and discharge ends, said product fluid being removed through the second adsorption zone discharge end as a separate fluid stream thereby cocurrently depressurizing such zone from said first pressure to a second lower pressure and thereby further moving said impurity adsorption front toward said second adsorption zone discharge end; thereafter desorbing said second adsorption zone to remove said impurity therefrom; and then repressurizing such zone to said first pressure; periodically switching the flows between said first and second adsorption zones so that the adsorption stroke is performed in the second adsorption zone and the cocurrent depressurization; desorption and repressurization strokes are performed in the first adsorption zone.

6. A process for continuously purifying a fluid stream which comprises providing a feed fluid stream containing an admixture of impurity and product fluid; providing at least three adsorption zones each having an inlet and a discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity within said adsorbent bed and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said first adsorption zone discharge end to a predetermined location within said first adsorption zone; terminating the introduction of said feed fluid stream at said first higher pressure to said first adsorption zone inlet end thereby completing an adsorption stroke; simultaneously with first zone adsorption stroke, removing at least most of the product fluid component of the feed fluid previously trapped in the voids of a second adsorption zone during a preceding stroke wherein an impurity adsorption front was established at a location intermediate said inlet and discharge ends, said product fluid being removed through the second adsorption zone discharge end as a separate fluid stream thereby cocurrently depressurizing such zone from said first pressure to a second lower pressure and thereby further moving said impurity adsorption front toward the second adsorption zone discharge end thereby completing a cocurrent depressurization stroke; simultaneously with the first zone adsorption stroke desorbing a third adsorption zone which has previously completed a cocurrent depressurization stroke to remove said impurity therefrom and then repressurizing said third adsorption zone to said first pressure thereby completing a desorption and repressurization stroke; periodically switching the flows between said adsorption zones so that the adsorption stroke takes place in the adsorption zone which has previously completed the desorption and repressurization stroke, the cocurrent depressurization stroke takes place in the adsorption zone which has previously completed the adsorption stroke, and the desorption and repressurization stroke takes place in the adsorption zone which has previously completed the cocurrent depressurization stroke.

7. A process for continuously purifying a fluid stream which comprises providing a feed fluid stream containing an admixture of impurity and product fluid; providing at least two adsorption zones, each having an inlet and discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher pressure to a second lower pressure and thereby further moving said impurity adsorption front toward said discharge end of said first adsorption zone; thereafter desorbing said first adsorption zone to remove said impurity therefrom; and then repressurizing said first adsorption zone to said first higher pressure; the flows between the adsorption zones being switched so that at least one zone is always on an adsorption stroke and each adsorption zone periodically passes through the steps of adsorption, cocurrent depressurization, desorption and repressurization.

8. A process for continuously separating a fluid stream into an impurity fluid stream and a product fluid stream which comprises providing a feed fluid stream containing an admixture of impurity and product fluid; providing at least two adsorption zones, each having an inlet and discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher superatmospheric pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher superatmospheric pressure to a second lower superatmospheric pressure and thereby further moving said impurity adsorption front toward said discharge end of said first adsorption zone; thereafter desorbing said first adsorption zone by drawing a vacuum pressure on said inlet end so as to flow the desorbed impurity countercurrently through said zone and recover a product-depleted impurity fluid stream; and then repressurizing said first adsorption zone to said first higher pressure; the flows between the adsorption zones being switched so that at least one zone is always on an adsorption stroke and each adsorption zone periodically passes through the steps of adsorption, cocurrent depressurization, desorption and repressurization.

9. A process for continuously purifying a fluid stream which comprises providing a feed fluid stream containing an admixture of impurity and product fluid; providing at least two adsorption zones, each having an inlet and discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher pressure to a second lower pressure and thereby further moving said impurity adsorption front toward discharge end of said first adsorption zone; pressurizing said removed trapped product fluid and cycling said fluid to said discharged impurity-depleted product fluid stream; thereafter desorbing said first adsorption zone to remove said impurity therefrom; and then repressurizing said first adsorption zone to said first higher pressure; the flows between the adsorption zones being switched so that at least one zone is always on an adsorption stroke and each adsorption zone periodically passes through the steps of adsorption, cocurrent depressurization, desorption and repressurization.

10. A process for continuously purifying a fluid stream which comprises providing a feed fluid stream containing an admixture of impurity and product fluid; providing at least two adsorption zones, each having an inlet and discharge end and containing therein a bed of absorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher pressure to a second lower pressure and thereby further moving said impurity adsorption front toward said discharge end of said first adsorption zone; thereafter desorbing said first adsorption zone to remove said impurity therefrom; first partially repressurizing said first adsorption zone with only removed trapped product fluid from a cocurrent depressurization step and then further repressurizing said adsorption zone to said first higher pressure; the flows between the adsorption zones being switched so that at least one zone is always on an adsorption stroke and each adsorption zone periodically passes through the steps of adsorption, cocurrent depressurization, desorption and repressurization.

11. A process for continuously purifying a fluid stream which comprises providing a feed fluid stream containing an admixture of impurity and product fluid; providing at least two adsorption zones, each having an inlet and discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher pressure to a second lower pressure and thereby further moving said impurity adsorption front toward said discharge end of said first adsorption zone; thereafter countercurrent desorbing said first adsorption zone to remove said impurity therefrom; and then repressurizing said first adsorption zone to said first higher pressure; the flows between the adsorption zones being switched so that at least one zone is always on an adsorption stroke and each adsorption zone periodically passes through the steps of adsorption, cocurrent depressurization, desorption and repressurization.

12. A process for continuously purifying a fluid stream which comprises providing a feed fluid stream containing an admixture of impurity and product fluid; providing at least two adsorption zones, each having an inlet and discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher pressure to a second lower pressure and thereby further moving said impurity adsorption front toward said discharge end of said first adsorption zone; thereafter removing at least most of said impurity from said first adsorption zone through said inlet end thereby countercurrently depressurizing said zone from said second lower pressure to a third lower pressure as a desorption stroke; and then repressurizing said first adsorption zone to said first higher pressure; the flows between the adsorption zones being switched so that at least one zone is always on an adsorption stroke and each adsorption zone periodically passes through the steps of adsorption, cocurrent depressurization, desorption and repressurization.

13. A process for continuously purifying a fluid stream which comprises providing a feed fluid stream containing an admixture of impurity and product fluid; providing at least two adsorption zones, each having an inlet and discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher pressure to a second lower pressure and thereby further moving said impurity adsorption front toward said discharge end of said first adsorption zone; thereafter removing at least most of said impurity from said first adsorption zone through said inlet end by countercurrently depressurizing said zone and passing a low pressure inert fluid stream as a purge fluid stream countercurrently through said zone; and then repressurizing said first adsorption zone to said first higher pressure; the flows between the adsorption zones being switched so that at least one zone is always on an adsorption stroke and each adsorption zone periodically passes through the steps of adsorption, cocurrent depressurization, desorption and repressurization.

14. A process for continuously purifying a fluid stream which comprises providing a feed fluid stream containing an admixture of impurity and product fluid; providing at least two adsorption zones, each having an inlet and discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher pressure to a second lower pressure and thereby further moving said impurity adsorption front toward said discharge end of said first adsorption zone; thereafter desorbing said first adsorption zone to remove said impurity therefrom; cycling part of an impurity-depleted product fluid stream from an adsorption stroke countercurrently through said zone thereby repressurizing said zone to said first higher pressure; the flows between the adsorption zones being switched so that at least one zone is always on an adsorption stroke and each adsorption zone periodically passes through the steps of adsorption, cocurrent depressurization, desorption and repressurization.

15. A process for continuously purifying a fluid stream which comprises providing a feed fluid stream containing an admixture of impurity and product fluid; providing at least two adsorption zones, each having an inlet and discharge end and containing therein a bed of adsorbent particles capable of selectively adsorbing said impurity from said feed fluid stream, said bed having voids between the adsorbent particles; introducing said feed fluid stream to a first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said discharge end to a predetermined location within said first adsorption zone; terminating the introduction of said feed fluid stream at said first higher pressure to said first adsorption zone inlet end thereby completing an adsorption stroke; thereafter removing at least most of the trapped product fluid component of the feed fluid trapped in the voids during the adsorption stroke through the discharge end of said first adsorption zone as a separate fluid stream thereby cocurrently depressurizing said zone from said first higher pressure to a second lower pressure and thereby further moving said impurity adsorption front toward said discharge end of said first adsorption zone; thereafter desorbing said first adsorption zone to remove said impurity therefrom; cycling non-adsorbable fluid stream at said first higher pressure countercurrently through said zone thereby repressurizing said zone; the flows between the adsorption zones being switched so that at least one zone is always on an adsorption stroke and each adsorption zone periodically passes through the steps of adsorption, cocurrent depressurization, desorption and repressurization.

16. A process for purifying a fluid stream which comprises providing a feed fluid stream containing an admixture of impurity and product fluid; providing an adsorption zone having an inlet and a discharge end and containing therein a bed of zeolitic molecular sieves capable of selectively adsorbing said impurity from said feed fluid stream, said bed having voids between said zeolitic molecular sieves; introducing said feed fluid stream to said inlet end of said adsorption zone and contacting such stream with said bed at a first higher pressure thereby adsorbing said impurity in said zeolitic molecular sieves and trapping part of said feed fluid in said voids; continuously discharging an impurity-depleted product fluid stream from said adsorption zone discharge end at substantially said first higher pressure during the introduction of said feed fluid stream to the first adsorption zone inlet end; establishing an impurity adsorption front at said inlet end of said adsorption zone; progressively moving such front longitudinally through said adsorption zone toward said discharge end to a predetermined location within said adsorption zone; terminating the introduction of said feed fluid stream at said first higher pressure to said inlet end of said adsorption zone; removing at least most of the trapped product fluid component of the feed fluid in said voids through said discharge end of said adsorption zone as a separate fluid stream thereby cocurrently depressurizing said adsorption zone from said first higher pressure to a second lower pressure and thereby further moving said impurity adsorption front toward said discharge end of said adsorption zone; and thereafter desorbing said adsorption zone to remove said impurity therefrom.

17. A process for purifying a fluid stream which comprises providing a feed fluid stream containing an admixture of impurity and product fluid; providing an adsorption zone having an inlet and a discharge end and containing therein a bed of zeolitic molecular sieves capable of selectively adsorbing said impurity from said feed fluid stream, said bed having voids between said zeolitic molecular sieves; introducing said feed fluid stream to said inlet end of said adsorption zone and contacting such stream with said bed at a first higher pressure thereby adsorbing said impurity in said zeolitic molecular sieves and trapping part of said feed fluid in said voids; continuously discharging an impurity-depleted product fluid stream from said adsorption zone discharge end at substantially said first higher pressure during the introduction of said feed fluid stream to the first adsorption zone inlet end; establishing an impurity adsorption front at said inlet end of said adsorption zone; progressively moving such front longitudinally through said adsorption zone toward such discharge end to a predetermined location within said adsorption zone; terminating the introduction of said feed gas stream at said first higher pressure to said inlet end of said adsorption zone; removing at least most of the trapped product fluid component of the feed fluid in said voids through said discharge end of said adsorption zone as a separate fluid stream thereby cocurrently depressurizing said adsorption zone from said first pressure to a second lower pressure and thereby further moving said impurity adsorption front toward said discharge end of said adsorption zone; thereafter desorbing said adsorption zone to remove said impurity therefrom; and repressurizing said adsorption zone to said first pressure.

18. A process as described in claim 16 wherein the fluid is a gas.

19. A process as described in claim 17 wherein the fluid is a gas.

20. A process for continuously purifying a fluid stream which comprises providing a seed fluid stream containing an admixture of impurity and product fluid; providing two adsorption zones each having an inlet and a discharge end and containing therein a bed of zeolitic molecular sieves capable of selectively adsorbing said impurity from said feed fluid stream, said bed having voids between said zeolitic molecular sieves; introducing said feed fluid stream to the first adsorption zone inlet end and contacting such stream with the first adsorption zone bed at a first higher pressure thereby adsorbing said impurity in said adsorbent and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said adsorption zone inlet end; progressively moving such front longitudinally through said first adsorption zone toward said discharge end to a predetermined location within said first adsorption zone terminating the introduction of said feed fluid stream at said first higher pressure to said first adsorption zone inlet end thereby completing an adsorption stroke; simultaneously with the first zone adsorption stroke, removing at least most of the product fluid component of the feed fluid previously trapped in the voids of the second adsorption zone during a preceding adsorption stroke wherein an impurity adsorption front was established at a location intermediate said inlet and discharge ends, said product fluid being removed through the second adsorption zone discharge end as a separate fluid stream thereby cocurrently depressurizing such zone from said first pressure to a second lower pressure and thereby further moving said impurity adsorption front toward said second adsorption zone discharge end; thereafter desorbing said second adsorption zone to remove said impurity therefrom; and then repressurizing such zone to said first pressure; periodically switching the flows between said first and second adsorption zones so that the adsorption stroke is performed in the second adsorption zone and the cocurrent depressurization; desorption and repressurization strokes are performed in the first adsorption zone.

21. A process for continuously purifying a fluid stream which comprises providing a feed fluid stream containing an admixture of impurity and product fluid; providing at least three adsorption zones each having an inlet and a discharge end and containing therein a bed of zeolitic molecular sieves capable of selectively adsorbing said impurity from said feed fluid stream, said bed having voids between said zeolitic molecular sieves; introducing said feed fluid stream to a first adsorption zone inlet end and contacting such stream with the first adsorption zone bed at a first pressure thereby adsorbing said impurity in said zeolitic molecular sieves and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said first adsorption zone discharge end to a predetermined location within said first adsorption zone; terminating the introduction of said feed fluid stream at said first higher pressure to said first adsorption zone inlet end thereby completing an adsorption stroke; simultaneously with the first zone adsorption stroke, removing at least most of the product fluid component of the feed fluid previously trapped in the voids of a second adsorption zone during a preceding adsorption stroke wherein an impurity adsorption front was established at a location intermediate said inlet and discharge ends, said product fluid being removed through the second adsorption zone discharge end as a separate fluid stream thereby cocurrently depressurizing such zone from said first pressure to a second lower pressure and thereby further moving said impurity adsorption front toward the second adsorption zone discharge end thereby completing a cocurrent depressurization stroke; simultaneously with the first zone adsorption stroke desorbing a third adsorption zone which has previously completed a cocurrent depressurization stroke to remove said impurity therefrom and then repressurizing said adsorption zone to said first pressure thereby completing a desorption and repressurization stroke; periodically switching the flows between said adsorption zones so that the adsorption stroke takes place in the adsorption zone which has previously completed the desorption and repressurization stroke, the cocurrent depressurization stroke takes place in the adsorption zone which has previously completed the adsorption stroke, and the desorption and repressurization stroke takes place in the adsorption zone which has previously completed the cocurrent depressurization stroke.

22. A process for continuously purifying a fluid stream which comprises providing a feed fluid stream containing an admixture of impurity and product fluid; providing at least three adsorption zones each having an inlet and a discharge end and containing therein a bed of zeolitic molecular sieves capable of selectively adsorbing said impurity from said feed fluid stream, said bed having voids between said zeolitic molecular sieves; introducing said feed fluid stream to a first adsorption zone inlet end and contacting such stream with the first adsorption zone bed at a first higher pressure thereby adsorbing said impurity in said zeolitic molecular sieves and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said first adsorption zone discharge end to a predetermined location within said first adsorption zone; terminating the introduction of said feed fluid stream at said first higher pressure to said first adsorption zone inlet end thereby completing an adsorption stroke; simultaneously with the first zone adsorption stroke, removing at least most of the product fluid component of the feed fluid previously trapped in the voids of a second adsorption zone during a preceding adsorption stroke wherein an impurity adsorption front was established at a location intermediate said inlet and discharge ends, said product fluid being removed through the second adsorption zone discharge end as a separate fluid stream thereby cocurrently depressurizing such zone from said first pressure to a second lower pressure and thereby further moving said impurity adsorption front toward the second adsorption zone discharge end; then desorbing said second adsorption zone to remove said impurity therefrom thereby completing a cocurrent depressurization and desorption stroke; simultaneously with the first zone adsorption stroke, repressurizing a third adsorption zone which has previously completed a cocurrent depressurization and desorption stroke to said first pressure thereby completing a repressurization stroke; periodically switching the flows between said adsorption zones so that the adsorption stroke takes place in the adsorption zone which has previously completed a repressurization stroke, the cocurrent depressurization and desorption stroke, takes place in the adsorption zone which has previously completed an adsorption stroke, and the repressurization stroke takes place in the adsorption zone which has previously completed a cocurrent depressurization and desorption stroke.

23. A process for continuously purifying a fluid stream which comprises providing a feed fluid stream containing an admixture of impurity and product fluid; providing at least four adsorption zones each having an inlet and a discharge end and containing therein a bed of zeolitic molecular sieves capable of selectively adsorbing said impurity from said feed fluid stream, said bed having voids between said zeolitic molecular sieves; introducing said feed fluid stream to a first adsorption zone inlet end and contacting such stream with the first adsorption zone bed at a first higher pressure thereby adsorbing said impurity in said zeolitic molecular sieves and trapping part of said feed fluid in said voids of such bed; continuously discharging an impurity-depleted product fluid stream from the first adsorption zone discharge end at substantially said first higher pressure during the introduction of said feed fluid stream to the first adsorption zone inlet end; establishing an impurity adsorption front at said first adsorption zone inlet end; progressively moving such front longitudinally through said first adsorption zone toward said first adsorption zone discharge end to a predetermined location with said first adsorption zone; terminating the introduction of said feed fluid stream at said first higher pressure to said first adsorption inlet end thereby completing an adsorption stroke; simultaneously with the first zone adsorption stroke, removing at least most of the product fluid component of the feed fluid previously trapped in the voids of a second adsorption zone during a preceding adsorption stroke wherein an impurity adsorption front was established at a location intermediate said inlet and discharge ends, said product fluid being removed through the second adsorption zone discharge end as a separate fluid stream thereby cocurrently depressurizing such zone from said first pressure to a second lower pressure and thereby further moving said impurity adsorption front toward the second adsorption zone discharge end thereby completing a cocurrent depressurization stroke; simultaneously with the first zone adsorption stroke, desorbing a third adsorption zone which has previously completed a cocurrent depressurization stroke to remove said impurity therefrom thereby completing a desorption stroke; simultaneously with the first zone adsorption stroke, repressurizing a fourth adsorption zone which has previously completed a desorption stroke to said first pressure thereby completing a repressurization stroke; periodically switching the flow between said adsorption zones so that the adsorption stroke takes place in the adsorption zone which has previously completed a repressurization stroke, the cocurrent depressurization stroke takes place in the adsorption zone which has previously completed an adsorption stroke, the desorption stroke takes place in an adsorption zone which has previously completed a cocurrent depressurization stroke, and the repressurization stroke takes place in the adsorption zone which has previously completed a desorption stroke.

24. A process as described in claim 23 wherein the impurity is essentially $CO_2$ and the product fluid is natural gas.

25. A process as described in claim 20 wherein the impurity is essentially normal butane and the product fluid is isobutane.

26. A process for continuously recovering linear hycarbons which comprising providing a feed gas stream containing an admixture of linear and non-linear hydrocarbons; providing at least two adsorption zones each having an inlet and discharge end and containing therein a bed of particles of zeolitic molecular sieves capable of selectively adsorbing said linear hydrocarbons, said bed having voids between the adsorbent particles; introducing said feed gas stream to a first adsorption zone inlet end and contacting such stream with the first adsorption zone bed at a first higher pressure thereby adsorbing said linear hydrocarbons on said zeolitic molecular sieves and trapping part of said feed gas in said voids of such bed; continuously discharging a linear hydrocarbon depleted gas stream from said first adsorption zone discharge end at substantially said first higher pressure during the introduction of said feed gas to the first adsorption zone inlet end; establishing a linear hydrocarbon adsorption front at said first adsorption zone inlet end; progressively moving such front longitudinally through said first adsorption zone toward said discharge end to a predetermined location within said first adsorption zone; terminating the introduction of said feed gas stream at said first higher pressure to said first adsorption zone inlet end thereby completing an adsorption stroke; thereafter removing at least most of the trapped non-linear hydrocarbon gas component of the feed gas trapped in the voids during the adsorption stroke through the discharge end of said first adsorption zone as a separate fluid stream thereby cocurrently depressurizing said zone from said first higher pressure to a second lower pressure and thereby further moving said linear hydrocarbon adsorption front toward said discharge end of said first adsorption zone; thereafter countercurrently desorbing said adsorption zone to remove said linear hydrocarbon therefrom thereby recovering a linear hydrocarbon gas stream; then cycling part of a non-linear hydrocarbon stream from an adsorption stroke countercurrently through said zone thereby repressurizing said zone to said first higher pressure; the flows between the adsorption zones being switched so that at least one zone is always on an adsorption stroke and each adsorption zone periodically passes through the steps of adsorption, concurrent depressurization, desorption and repressurization.

27. A process as described in claim 26 wherein the desorption step is accomplished by first countercurrently depressurizing said adsorption zone from said second lower pressure to a third lowest pressure and then countercurrently passing a purge fluid stream through said adsorption zone at said third lowest pressure.

28. A process as described in claim 20 wherein the repressurization step is accomplished by first countercurrently flowing said product fluid from the adsorption zone being cocurrently depressurized to the adsorption zone being repressurized, and completing the repressurization by cocurrently flowing said feed fluid to such zone.

References Cited by the Examiner

UNITED STATES PATENTS

| | | | |
|---|---|---|---|
| 2,882,243 | 4/59 | Milton | 55—75 |
| 2,944,627 | 7/60 | Skarstrom | 55—33 |
| 3,024,868 | 3/62 | Milton | 55—33 |
| 3,085,379 | 4/63 | Kiyonaga et al. | 55—75 |
| 3,086,339 | 4/63 | Skarstrom et al. | 55—26 |
| 3,111,387 | 11/63 | Avery | 55—75 |
| 3,130,021 | 4/64 | Milton | 55—33 |
| 3,155,468 | 11/64 | De Montgareuil et al. | 55—58 X |

REUBEN FRIEDMAN, *Primary Examiner.*

HARRY B. THORNTON, *Examiner.*